United States Patent [19]
Aucsmith et al.

[11] Patent Number: 5,892,899
[45] Date of Patent: Apr. 6, 1999

[54] TAMPER RESISTANT METHODS AND APPARATUS

[75] Inventors: David Aucsmith, Portland; Gary Graunke, Beaverton, both of Oreg.

[73] Assignee: Intel Corporation, Santa Clara, Calif.

[21] Appl. No.: 662,679

[22] Filed: Jun. 13, 1996

[51] Int. Cl.⁶ .................................................. H04L 9/00
[52] U.S. Cl. .............................. 395/186; 380/4; 380/30; 380/36
[58] Field of Search .............................. 395/186, 187.01, 395/188.01; 380/4, 23, 24, 3, 25, 42, 43, 44, 21, 28, 29, 30, 36

[56] References Cited

U.S. PATENT DOCUMENTS

| | | | |
|---|---|---|---|
| 4,786,790 | 11/1988 | Kruse et al. | |
| 4,926,480 | 5/1990 | Chaum | 380/23 |
| 5,224,160 | 6/1993 | Paulini et al. | 380/4 |
| 5,265,164 | 11/1993 | Matyas et al. | 380/30 |
| 5,347,579 | 9/1994 | Blandford | 380/25 |
| 5,469,507 | 11/1995 | Canetti et al. | 380/30 |
| 5,535,276 | 7/1996 | Ganesan | 380/25 |

OTHER PUBLICATIONS

Virus Detection and Elimination by Rune Skardhamar, copyright 1996 by Academic Press, Inc., pp. 171 to 182.

*Primary Examiner*—Albert Decady
*Attorney, Agent, or Firm*—Blakely, Sokoloff, Taylor & Zafman LLP

[57] ABSTRACT

In accordance with a first aspect of the present invention, a security sensitive program that operates with a secret is made tamper resistant by distributing the secret in space as well as in time. In accordance with a second aspect of the present invention, a security sensitive program is made tamper resistant by obfuscating the program. In accordance with a third aspect of the present invention, a security sensitive application is made tamper resistant by isolating its security sensitive functions, and making the isolated security sensitive functions tamper resistant by distributing the secrets of the security sensitive functions in time as well as in space, and/or obfuscating the security sensitive functions. In one embodiment where obfuscation is employed, the pseudo-randomly selected pattern(s) of mutations is (are) unique for each installation. In accordance with a fourth aspect of the present invention, a security sensitive system with security sensitive applications is made further tamper resistant by deploying an interlocking trust mechanism. In accordance with a fifth aspect of the present invention, a content industry association, in conjunction with content manufacturers, content reader manufacturers, and content player manufacturers of the industry jointly implement a coordinated encryption/decryption scheme, with the player apparatus manufactured by the content player manufacturers employing playing software that include tamper resistant decryption functions.

57 Claims, 20 Drawing Sheets

100

SUBPART OF SECRET
101

102

SUBPART OF SECRET
101

102

•
•
•

SUBPART OF SECRET
101

PROGRAM

| SPGM 0 = 000 | 102' |
| SPGM1 = 001 | 102' |
| SPGM2 = 010 | 102' |
| SPGM3 = 011 | 102' |
| SPGM4 = 100 | 102' |
| SPGM5 = 101 | 102' |

PERIOD = 6

KEY LENGTH = 1

KEY = 3

MUTATION PARTNERSHIP FUNCTION

PARTNER CELL = CELL ID + 3

MUTATION 0

| IV 0 | 202' |
| IV 1 | 202' |
| IV 2 | 202' |
| IV 3 | 202' |
| IV 4 | 202' |
| IV 5 | 202' |

$$M1 \begin{array}{c} \phantom{C0} \\ C0 \\ C1 \\ C2 \\ C3 \\ C4 \\ C5 \end{array} \begin{array}{c} IV0 \; IV1 \; IV2 \; IV3 \; IV4 \; IV5 \\ \left[ \begin{array}{cccccc} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{array} \right] \end{array} \leftarrow 218'a$$

$$M2 \quad \begin{array}{c} IV0 \; IV1 \; IV2 \; IV3 \; IV4 \; IV5 \\ SPGM\,0 \; [\; 1 \quad 0 \quad 0 \quad 0 \quad 0 \quad 0 \;] \end{array} \leftarrow 218'b$$

SPGM 0 → C0

MUTATION 1

| IV 0 | 202' |
| IV 1 | 202' |
| IV 2 | 202' |
| IV 3 ⊗ IV 0 | 202' |
| IV 4 ⊗ IV 1 | 202' |
| IV 5 ⊗ IV 2 | 202' |

$$M1 \begin{array}{c} \phantom{C0} \\ C0 \\ C1 \\ C2 \\ C3 \\ C4 \\ C5 \end{array} \begin{array}{c} IV0 \; IV1 \; IV2 \; IV3 \; IV4 \; IV5 \\ \left[ \begin{array}{cccccc} 1 & 0 & 0 & 0 & 0 & 0 \\ 0 & 1 & 0 & 0 & 0 & 0 \\ 0 & 0 & 1 & 0 & 0 & 0 \\ 1 & 0 & 0 & 1 & 0 & 0 \\ 0 & 1 & 0 & 0 & 1 & 0 \\ 0 & 0 & 1 & 0 & 0 & 1 \end{array} \right] \end{array} \leftarrow 218'a$$

$$M2 \quad \begin{array}{c} IV0 \; IV3 \; IV2 \; IV1 \; IV4 \; IV5 \\ SPGM\,0 \; [\; 1 \quad 0 \quad 0 \quad 0 \quad 0 \quad 0 \;] \\ SPGM\,1 \; [\; 1 \quad 1 \quad 0 \quad 0 \quad 0 \quad 0 \;] \end{array} \leftarrow 218'b$$

SPGM 1 → C3

FIG. 10

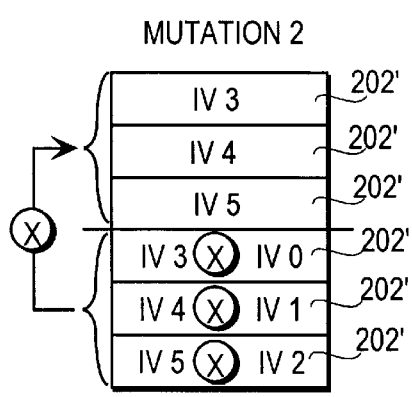
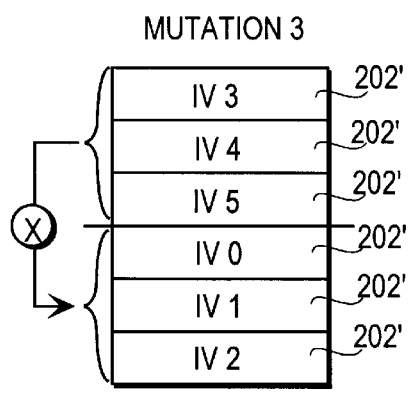
FIG. 11

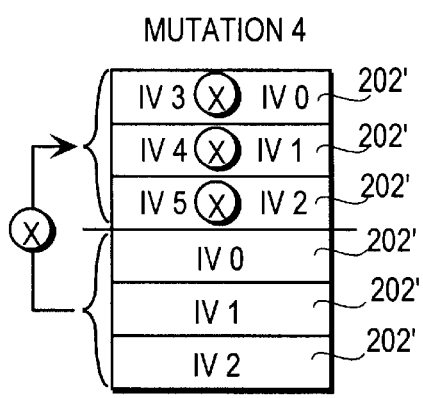

$$M1 \quad \begin{array}{c} \\ C0 \\ C1 \\ C2 \\ C3 \\ C4 \\ C5 \end{array} \begin{array}{cccccc} IV0 & IV1 & IV2 & IV3 & IV4 & IV5 \\ \left[\begin{array}{cccccc} 1 & 0 & 0 & 1 & 0 & 0 \\ 0 & 1 & 0 & 0 & 1 & 0 \\ 0 & 0 & 1 & 0 & 0 & 1 \\ 1 & 0 & 0 & 0 & 0 & 0 \\ 0 & 1 & 0 & 0 & 0 & 0 \\ 0 & 0 & 1 & 0 & 0 & 0 \end{array}\right] \end{array} \leftarrow 218'a$$

$$M2 \quad \begin{array}{c} \\ SPGM\ 0 \\ SPGM\ 1 \\ SPGM\ 2 \\ SPGM\ 3 \\ SPGM\ 4 \end{array} \begin{array}{cccccc} IV0 & IV3 & IV4 & IV1 & IV2 & IV5 \\ \left[\begin{array}{cccccc} 1 & 0 & 0 & 0 & 0 & 0 \\ 1 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 1 \end{array}\right] \end{array} \leftarrow 218'b$$

SPGM 4 → C4

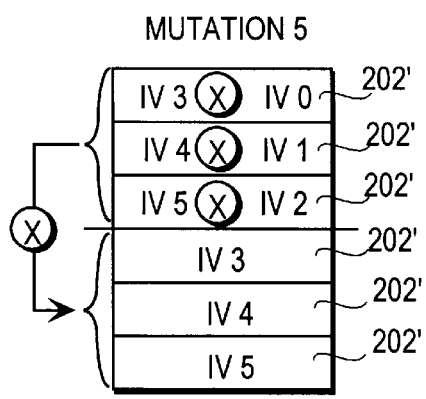

$$M1 \quad \begin{array}{c} \\ C0 \\ C1 \\ C2 \\ C3 \\ C4 \\ C5 \end{array} \begin{array}{cccccc} IV0 & IV1 & IV2 & IV3 & IV4 & IV5 \\ \left[\begin{array}{cccccc} 1 & 0 & 0 & 1 & 0 & 0 \\ 0 & 1 & 0 & 0 & 1 & 0 \\ 0 & 0 & 1 & 0 & 0 & 1 \\ 0 & 0 & 0 & 1 & 0 & 0 \\ 0 & 0 & 0 & 0 & 1 & 0 \\ 0 & 0 & 0 & 0 & 0 & 1 \end{array}\right] \end{array} \leftarrow 218'a$$

$$M2 \quad \begin{array}{c} \\ SPGM\ 0 \\ SPGM\ 1 \\ SPGM\ 2 \\ SPGM\ 3 \\ SPGM\ 4 \\ SPGM\ 5 \end{array} \begin{array}{cccccc} IV0 & IV3 & IV4 & IV1 & IV2 & IV5 \\ \left[\begin{array}{cccccc} 1 & 0 & 0 & 0 & 0 & 0 \\ 1 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 1 \\ 0 & 0 & 0 & 0 & 0 & 1 \end{array}\right] \end{array} \leftarrow 218'b$$

SPGM 5 → C5

$$218'b \rightarrow \begin{bmatrix} 1\,0\,0\,0\,0\,0 \\ 1\,1\,0\,0\,0\,0 \\ 0\,0\,1\,0\,0\,0 \\ 0\,0\,0\,1\,0\,0 \\ 0\,0\,0\,0\,1\,1 \\ 0\,0\,0\,0\,0\,1 \end{bmatrix} \begin{bmatrix} \text{SPGM } \emptyset \\ \text{SPGM 1} \\ \text{SPGM 2} \\ \text{SPGM 3} \\ \text{SPGM 4} \\ \text{SPGM 5} \end{bmatrix} = \begin{bmatrix} \text{IV}\emptyset \\ \text{IV3} \\ \text{IV4} \\ \text{IV1} \\ \text{IV2} \\ \text{IV5} \end{bmatrix} \begin{bmatrix} \text{SPGM } \emptyset \\ \text{SPGM 1} \\ \text{SPGM 2} \\ \text{SPGM 3} \\ \text{SPGM 4} \\ \text{SPGM 5} \end{bmatrix}$$

$$218'c \rightarrow \begin{bmatrix} 1\,0\,0\,0\,0\,0 \\ 1\,1\,0\,0\,0\,0 \\ 0\,0\,1\,0\,0\,0 \\ 0\,0\,0\,1\,0\,0 \\ 0\,0\,0\,0\,1\,1 \\ 0\,0\,0\,0\,0\,1 \end{bmatrix} \begin{bmatrix} \text{SPGM 1} \\ \text{SPGM 3} \\ \text{SPGM 4} \otimes \\ \text{SPGM } \emptyset \otimes \\ \text{SPGM 2} \\ \text{SPGM 5} \end{bmatrix} \begin{matrix} \\ \\ \text{SPGM 5} \\ \text{SPGM 1} \\ \\ \end{matrix} = \begin{bmatrix} \text{IV}\emptyset \\ \text{IV3} \\ \text{IV4} \\ \text{IV1} \\ \text{IV2} \\ \text{IV5} \end{bmatrix} = \begin{bmatrix} 0\,0\,0 \\ 0\,1\,1 \\ 0\,0\,1 \\ 0\,0\,1 \\ 0\,1\,0 \\ 1\,0\,1 \end{bmatrix} \begin{matrix} \leftarrow 202' \\ \leftarrow 202' \\ \leftarrow 202' \\ \leftarrow 202' \\ \leftarrow 202' \\ \leftarrow 202' \end{matrix}$$

TAMPER RESISTANT METHODS AND APPARATUS

BACKGROUND OF THE INVENTION

1. Field of the Invention

The present invention relates to the field of system security. More specifically, the present invention relates to the tamper resistant methods and apparatus.

2. Background Information

Many applications, e.g. financial transactions, unattended authorizations and content management, require the basic integrity of their operations to be assumed, or at least verified. While a number of security approaches such as encryption and decryption techniques are known in the art, unfortunately, the security approaches can be readily compromised, because these applications and the security approaches are implemented on systems with an open and accessible architecture, that renders both hardware and software including the security approaches observable and modifiable by a malevolent user or a malicious program.

Thus, a system based on open and accessible architecture is a fundamentally insecure platform, notwithstanding the employment of security measures. However, openness and accessibility offer a number of advantages, contributing to these systems' successes. Therefore, what is required are techniques that will render software execution virtually unobservable or unmodifiable on these fundamentally insecure platforms, notwithstanding their openness and accessibility. As will be disclosed in more detail below, the present invention of tamper resistant methods and apparatus achieve these and other desirable results.

SUMMARY OF THE INVENTION

In accordance with a first aspect of the present invention, a security sensitive program that operates with a secret is made tamper resistant by distributing the secret in space as well as in time. The secret is partitioned into a number of subparts, and the security sensitive program is unrolled into a number of subprograms that operate with the subparts, one subpart per subprogram. The subprograms are then executed over a period of time. In one embodiment, the subprograms are further interleaved with unrelated tasks. In one application, the security sensitive program is a decryption program and the secret is a private key.

In accordance with a second aspect of the present invention, a security sensitive program is made tamper resistant by obfuscating the program. The security sensitive program is divided into a number of subprograms, and a plaintext appearance location schedule is selected for the subprograms. An appropriate mutated initial state is determined for each of the subprograms, except for the subprogram where the program's entry point is located. The mutated initial states are determined based on one or more pseudo-randomly selected patterns of mutations that return the program to the initial state at the end of an execution pass. During execution, the subprograms are recovered when they are needed, one or more but not all at a time, following the pseudo-randomly selected pattern(s) of mutations. In one embodiment, each pseudo-randomly selected pattern of mutations is determined using a predetermined partnership function in conjunction with an ordered set of pseudo-random keys. In one application, the security sensitive program is a decryption program that operates with a secret private key. The decryption program may or may not have been made tamper resistant by distributing the secret private key in time as well as in space.

In accordance with a third aspect of the present invention, a security sensitive application is made tamper resistant by isolating its security sensitive functions, and making the isolated security sensitive functions tamper resistant by distributing the secrets of the security sensitive functions in time as well as in space, and/or obfuscating the security sensitive functions. In one embodiment where obfuscation is employed, the pseudo-randomly selected pattern(s) of mutations is (are) unique for each installation. In one application, the application is a content management application having a decryption function.

In accordance with a fourth aspect of the present invention, a security sensitive system with security sensitive applications is made further tamper resistant by providing a system integrity verification program having tamper resistant integrity verification kernels, that jointly deploy an interlocking trust mechanism with the tamper resistant security sensitive functions of the security sensitive applications. In one application, the system is a content manipulation system, and the application is a content management application.

In accordance with a fifth aspect of the present invention, a content industry association, in conjunction with content manufacturers, content reader manufacturers, and content player manufacturers of the industry jointly implement a coordinated encryption/decryption scheme, with the player apparatus manufactured by the content player manufacturers employing playing software that include tamper resistant decryption functions.

BRIEF DESCRIPTION OF DRAWINGS

The present invention will be described by way of embodiments, but not limitations, illustrated in the accompanying drawings in which like references denote similar elements, and in which:

FIG. 1 is a block diagram illustrating a first aspect of the present invention for making a security sensitive program tamper resistant by distributing the program's secret(s) in time and in space;

FIGS. 10–14 are diagrams illustrating a sample application of the second aspect of the present invention;

DETAILED DESCRIPTION OF THE INVENTION

Figure 2:
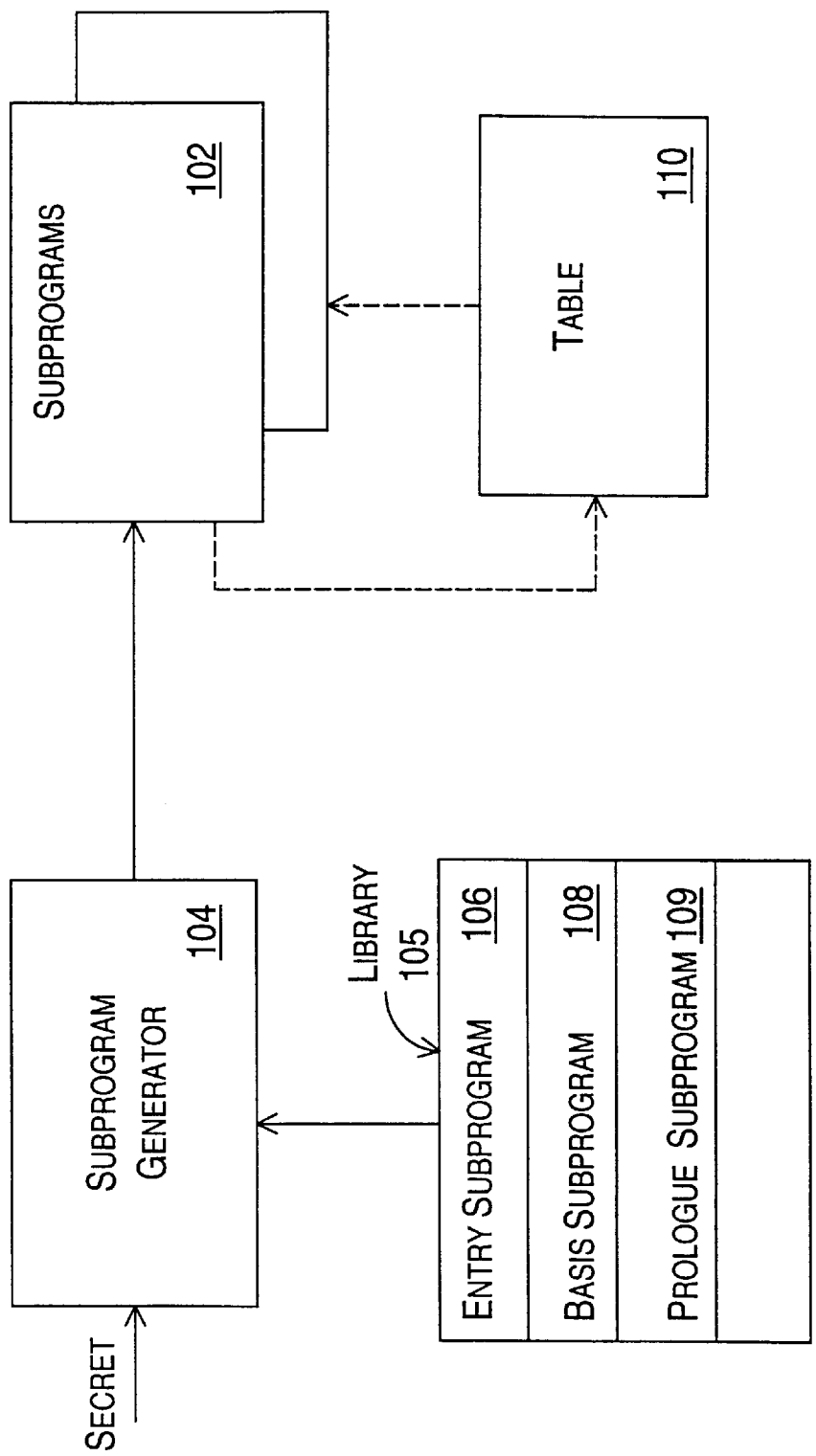
FIG. 2 is a block diagram illustrating one embodiment of the first aspect of the present invention including a subprogram generator for generating the subprograms that operate with corresponding subparts of the distributed secret(s)

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Referring now to FIG. 1, a block diagram illustrating a first aspect of the present invention is shown. In accordance with this first aspect of the present invention, security sensitive program 100 is made tamper resistant by distributing its secret in space as well as in time. The secret (not shown in totality) is "partitioned" into subparts 101, and program 100 is unrolled into a number of subprograms 102 that operate with subparts 101; for the illustrated embodiment, one subpart 101 per subprogram 102. Subprograms 102 are then executed over a period of time. As a result, the complete secret cannot be observed or modified in any single point in space nor in any single point in time.

For example, consider the artificially simple "security sensitive" program for computing the result of X multiply by S, where S is the secret. Assuming S equals to 8, S can be divided into 4 subparts, with each subpart equals 2, and the "security sensitive" program can be unrolled into 4 subprograms with each program computing A=A+(X multiply by 2). Thus, the complete secret 8 can never be observed or modified in any point in space nor time.

As a further example, consider the "security sensitive" program for computing the result of (X to the power of S) modulo Y, where S again is the secret. If S equals 16, S can be divided into 8 subparts, with each subpart equals 2, and the "security sensitive" program can be unrolled into 8 subprograms with each program computing A=(A multiply by ((X to the power of 2) modulo Y)) modulo Y. Thus, the complete secret 16 can never be observed or modified in any point in space nor time.

As will be appreciated by those skilled in the art, the function (X to the power of S) modulo Y is the basis function employed in many asymmetric key (private/public key) schemes for encryption and decryption. Thus, by practicing this first aspect of the present invention, an encryption/decryption function can be made tamper resistant.

In one embodiment, the subprograms are further interleaved with unrelated tasks to further obscure the true nature of the tasks being performed by the unrolled subprograms. The tasks may even have no purpose to them.

FIG. 2 illustrates one embodiment of the first aspect of the present invention including a subprogram generator for generating the subprograms. For the illustrated embodiment, subprogram generator 104 is provided with the secret as input. Furthermore, subprogram generator 104 is provided with access to library 105 having entry, basis and prologue subprograms 106, 108, and 109 for use in generating subprograms 102 of a particular security sensitive program in view of the secret provided. In other words, entry and basis subprograms 106 and 108 are employed differently for different security sensitive programs. For the above illustrated examples, in the first case, entry and basis subprograms 106 and 108 will initialize and compute A=A+(X multiply by a subpart of S), whereas in the second case, entry and basis subprograms 106 and 108 will initialize and compute A=(A multiply by ((X to the power of a subpart of S) modulo Y)) modulo Y. Prologue subprogram 109 is used to perform post processing, e.g., outputting the computed results as decrypted content.

For the illustrated embodiment, entry subprogram 106 is used in particular to initialize an appropriate runtime table 110 for looking up basis values by basis subprogram 108, and basis subprogram 108 is used to perform the basis computation using runtime table 110. For the modulo function example discussed above, runtime table 110 is used to return basis values for (X to the power of a subpart of secret) modulo Y for various subpart values, and basis subprogram 108 is used to perform the basis computation of A=(A multiply by (basis value of a subpart of secret)) modulo Y, where A equals the accumulated intermediate results. A's initial value is 1.

For example, entry subprogram 106 may initialize a runtime table 110 of size three for storing the basis values of bv1, bv2 and bv3, where bv1, bv2 and bv3 equal (X to the power of 1) modulo Y, (X to the power of 2) modulo Y, and (X to the power of 3) modulo Y respectively. For the modulo function (X to the power of 5) modulo Y, subprogram generator 104 may partition the secret 5 into two subparts with subpart values 3 and 2, and generate two basis programs 108 computing A=(A*Lkup(3)) modulo Y and A=(A*Lkup(2)) modulo Y respectively.

Figure 3:
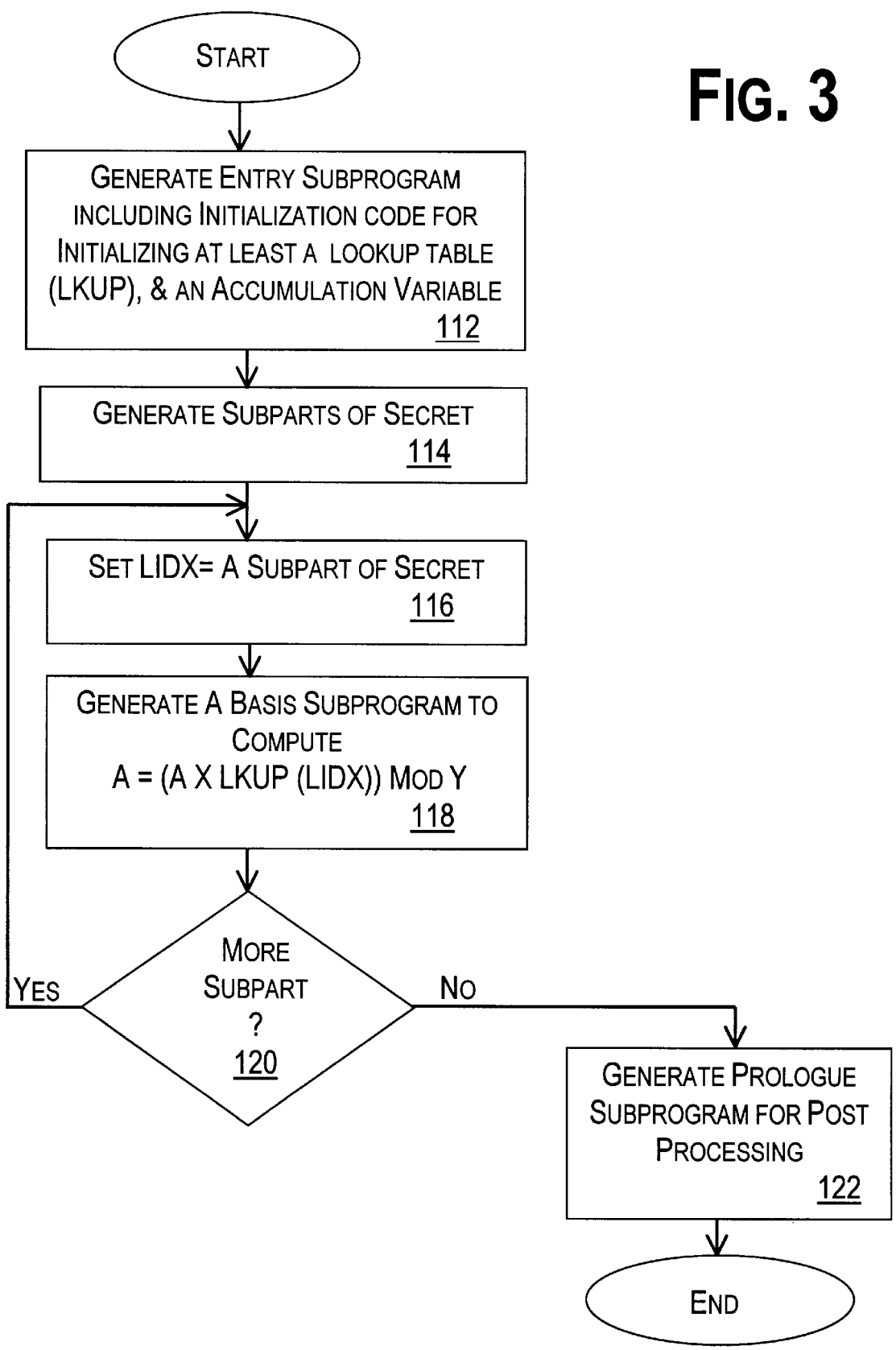
FIG. 3 is a flow diagram illustrating one embodiment of the operational flow of the subprogram generator of FIG. 2.

FIG. 3 illustrates one embodiment of the operational flow of subprogram generator 104 of FIG. 2. For the illustrated embodiment, upon invocation, subprogram generator 104 first generates an instance of entry subprogram 106 for initializing at least an appropriate runtime lookup table 110 (Lkup) for returning the basis values of a modulo function for various subparts of a secret, and an accumulation variable (A) to an appropriate initial state, step 112. Subprogram generator 104 then partitions the secret into subparts, step 114. In one embodiment, the partition is performed to require the least number of basis programs, within the constraint of the basis values stored in runtime table 110.

Next, subprogram generator 104 sets a subpart of the secret as the lookup index (LIDX), step 116. Then, subprogram generator 104 generates the current basis subprogram to compute A=[A multiply by Lkup (LIDX)] modulo Y, step 118. Subprogram generator 104 repeats steps 116–118 for all subparts, until a basis program has been generated for each subpart of the secret, step 120. Finally, subprogram generator 104 generates an instance of prologue subprogram 109 for performing post processing, as described earlier, step 122.

Figure 4:
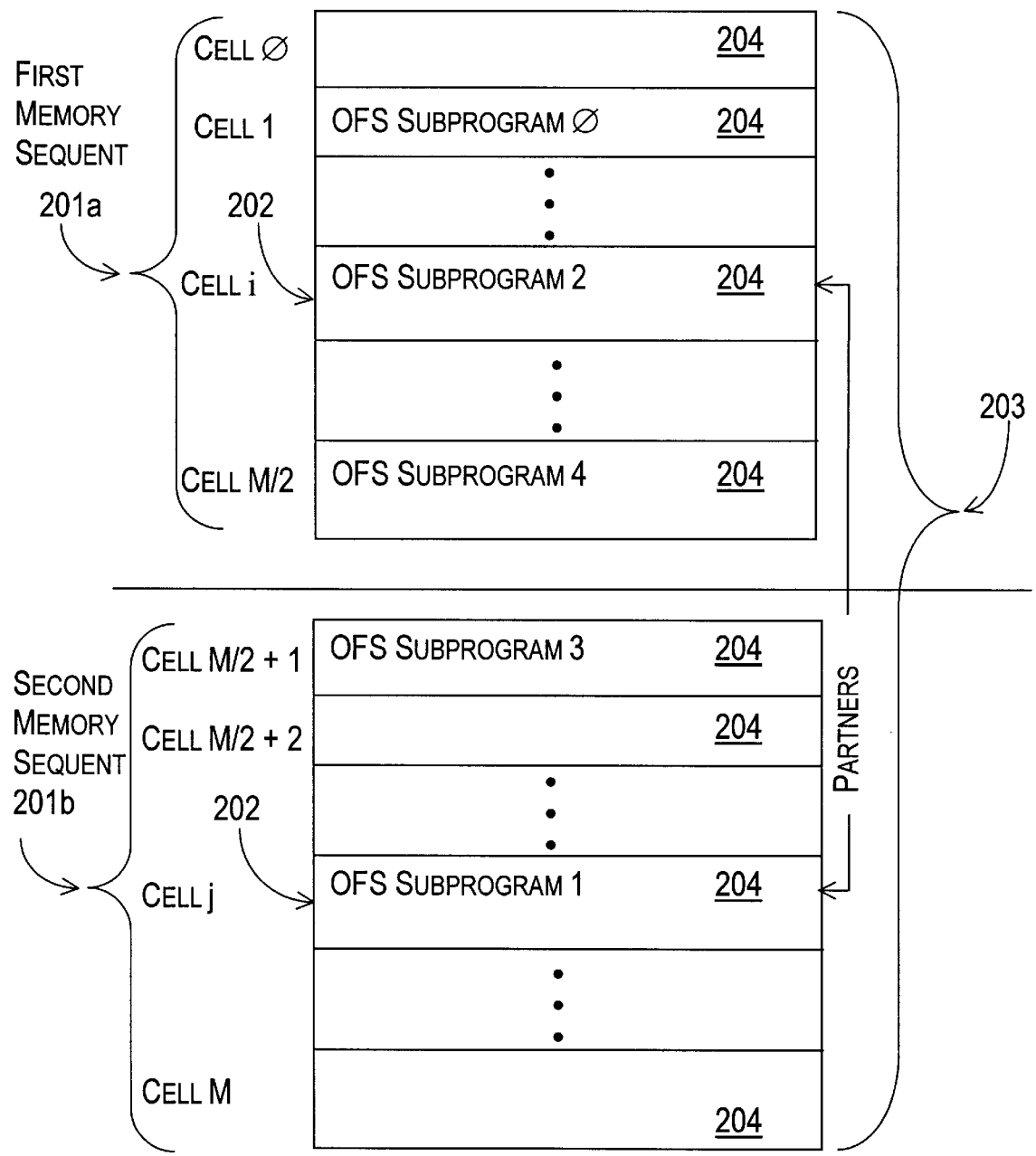
FIG. 4 is a block diagram illustrating a second aspect of the present invention for making a security sensitive program tamper resistant by obfuscating the various subparts of the security sensitive program.

FIG. 4 illustrates a second aspect of the present invention. In accordance with this second aspect of the present invention, security sensitive program 203 is made tamper resistant by obfuscating the program. Security sensitive program 203 is divided and processed into a number of obfuscated subprograms 204. A plaintext (i.e., unmutated) appearance location schedule (i.e. where in memory) is selected for obfuscated subprograms 204. For the illustrated embodiment, the plaintext appearance location schedule is formulated in terms of the memory cells 202 of two memory segments, memory segment 201a and memory segment 201b. Initially, except for obfuscated subprogram 204 where the program's entry point is located, all other obfuscated subprograms 204 are stored in mutated states. Obfuscated subprograms 204 are recovered or made to appear in plaintext form at the desired memory cells 202, one or more at a time, when they are needed for execution, and mutated again, once executions are completed. As will be described in more detail below, the initial mutated states, and the process of recovery, are determined or performed in accordance with one or more pseudo-randomly selected pattern of mutations. The pseudo-randomly selected pattern(s) of mutations is (are) determined using a predetermined mutation partnership function in conjunction with one or more ordered sets of pseudo-random keys. As a result, obfuscated subprograms 204 cyclically mutate back to their respective initial states after each execution pass. Actually, obfuscated subprograms 204 implementing the same loop also cyclically mutate back to the loop entry states after each pass through the loop.

For the illustrated embodiment, each obfuscated subprogram 204 and each cell 202 are of the same size, and first memory segment 201a is located in high memory, whereas second memory segment 201b is located in low memory. Furthermore, there are an even number of obfuscated subprograms 204, employing dummy subprogram if necessary.

Figure 5:
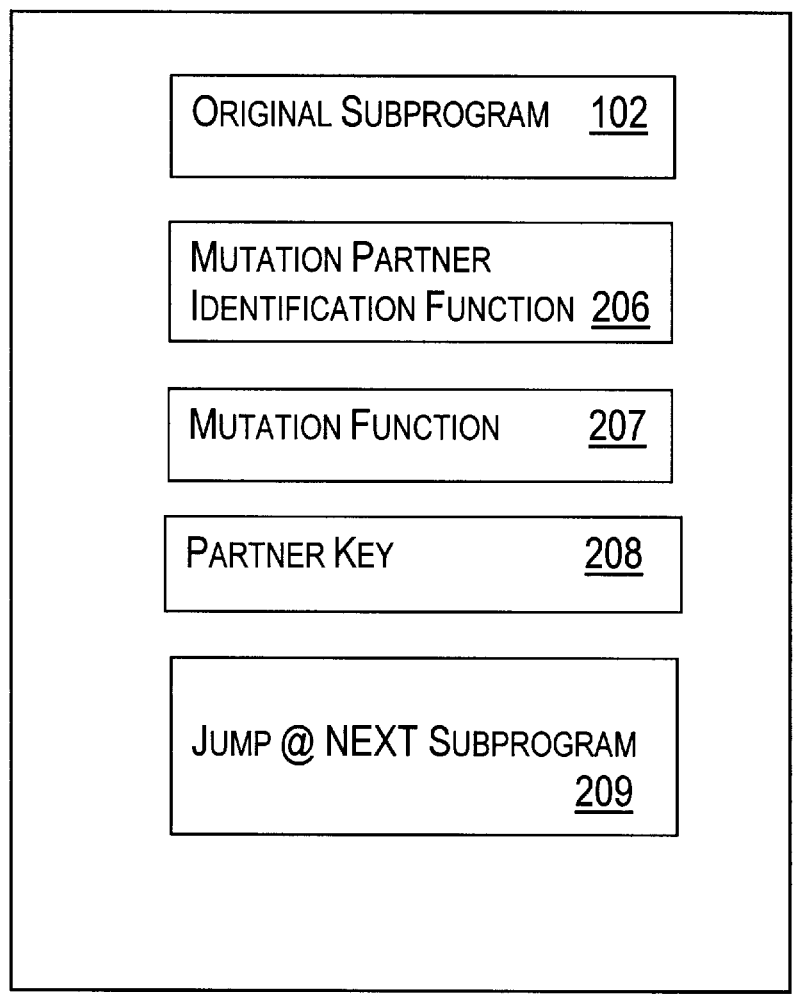
FIG. 5 is a block diagram illustrating one embodiment of a subpart of the obfuscated program.

FIG. 5 illustrates one embodiment of subprogram 204. In accordance with the present invention, for the illustrated embodiment, in addition to original subprogram 102, obfuscated subprogram 204 is provided with mutation partner identification function 206, mutation function 207, partner key 208 and jump block 209. Original subprogram 102 performs a portion of the functions performed by program 100. Original subprogram 102 may be an entry/basis/prologue subprogram 106/108/109 in accordance with the first aspect of the present invention. Mutation partner identification function 206 is used to identify the partner memory cell 202 for all memory cells 202 at each mutation round. In one embodiment, the partner identification function 206 is the function: Partner Cell ID=Cell ID XOR Pseudo-Random Key. For a pseudo-random key, mutation partner identification function 206 will identify a memory cell 202 in the second memory segment 201b as the partner memory cell for of a memory cell 202 in the first memory segment 201a, and vice versa. Only ordered sets of pseudo-random keys that will provide the required periods for the program and its loops will be employed. The length of a period is a function of the pseudo-random keys' set size (also referred to as key length). Mutation function 207 is used to mutate the content of the various memory cells 202. In one embodiment, mutation function 207 XORs the content of each memory cell 202 in first memory segment 201a into the partner memory cell 202 in second memory segment 201b in an odd mutation round, and XORS the content of each memory cell 202 in second memory segment 201b into the partner memory cell 202 in first memory segment 201a in an even mutation round. Partner key 208 is the pseudo-random key to be used by mutation partner identification function 206 to identify mutation partners of the various memory cells 202 for a mutation round. Jump block 209 transfers execution control to the next obfuscated subprogram 204, which at the time of transfer, has been recovered into plaintext through the pseudo-random pattern of mutations.

In one embodiment, an obfuscated subprogram 204 may also include other functions being performed for other purposes or simply unrelated functions being performed to further obscure the subpart functions being performed.

Figure 6:
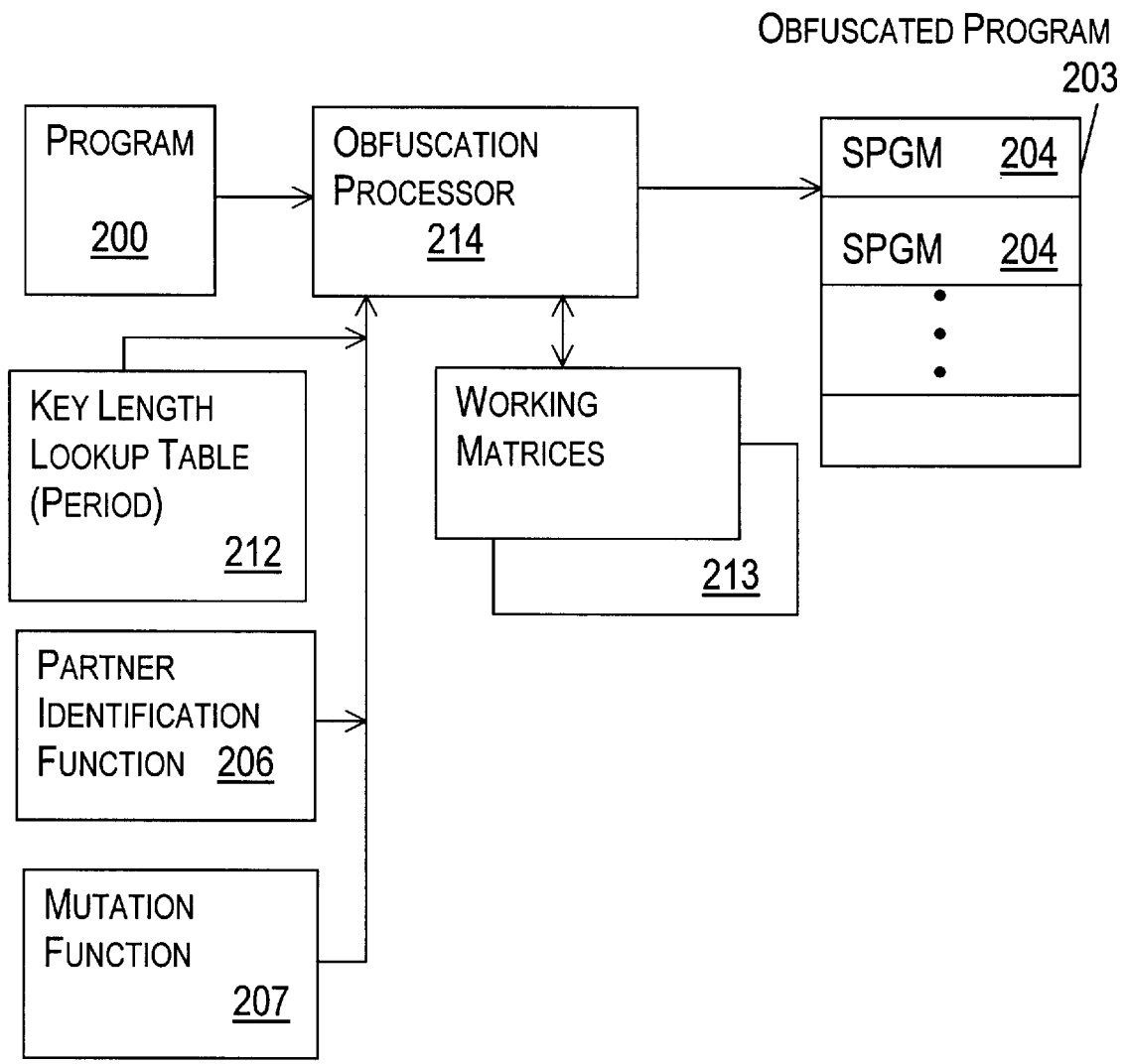
FIG. 6 is a block diagram illustrating one embodiment of the second aspect of the present invention including an obfuscation processor for generating the obfuscated program.

FIG. 6 illustrates one embodiment of the second aspect of the present invention including an obfuscation processor for processing and transforming subprograms into obfuscated subprograms. For the illustrated embodiment, obfuscation processor 214 is provided with program 200 as an input. Furthermore, obfuscation processor 214 is provided with access to pseudo-random keys' key length lookup table 212, mutation partner identification function 206, and mutation function 207. For the illustrated embodiment, obfuscation processor 214 also uses two working matrices 213 during generation of obfuscated program 203.

Figure 7:
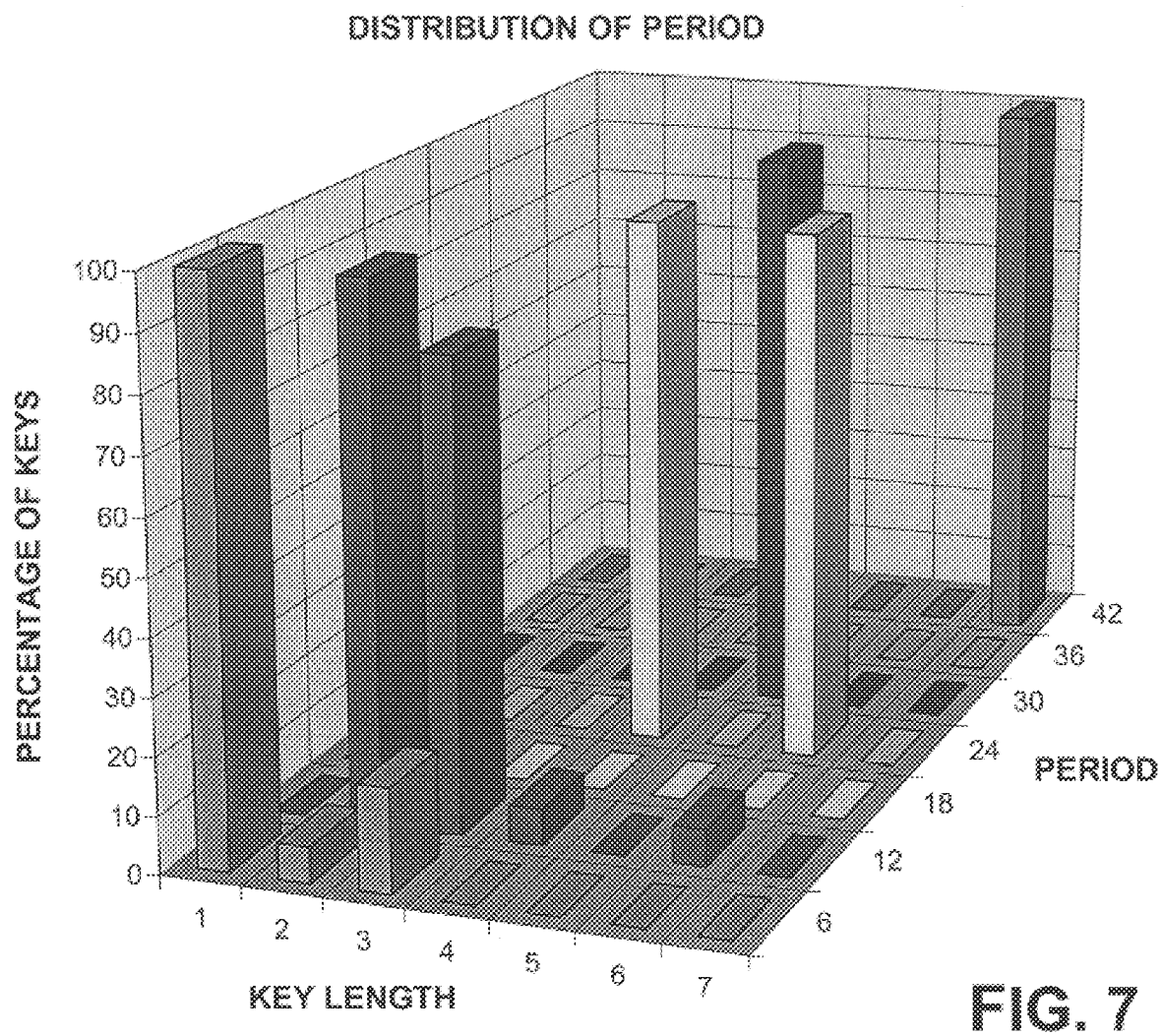
FIG. 7 is a graphical diagram illustrating distribution of key period for the second aspect of the present invention.

Key length lookup table 212 provides obfuscation processor 214 with key lengths that provide the required periods by the program and its loops. Key lengths that will provide the required periods are a function of the mutation technique and the partnership function. FIG. 7 illustrates various key lengths that will provide various periods for the first and second memory segment mutation technique and the partnership function described above.

Referring back to FIG. 6, mutation partner identification function 206 identifies a mutation partner memory cell 202 for each memory cell 202. In one embodiment, mutation partner identification function 206 identifies mutation partner memory cells in accordance with the "XOR" mutation partner identification function described earlier. Mutation function 207 mutates all memory cells 202. In one embodiment, mutation function 207 mutates memory cells 202 in accordance with the two memory segments, odd and even round technique described earlier.

For the illustrated embodiment, working matrices 213 include two matrices M1 and M2. Working matrix M1 stores the Boolean functions of the current state of the various memory cells 202 in terms of the initial values of memory cells 202. Working matrix M2 stores the Boolean functions for recovering the plaintext of the various obfuscated subprograms 204 in terms of the initial values of memory cells 202.

Figure 8A:
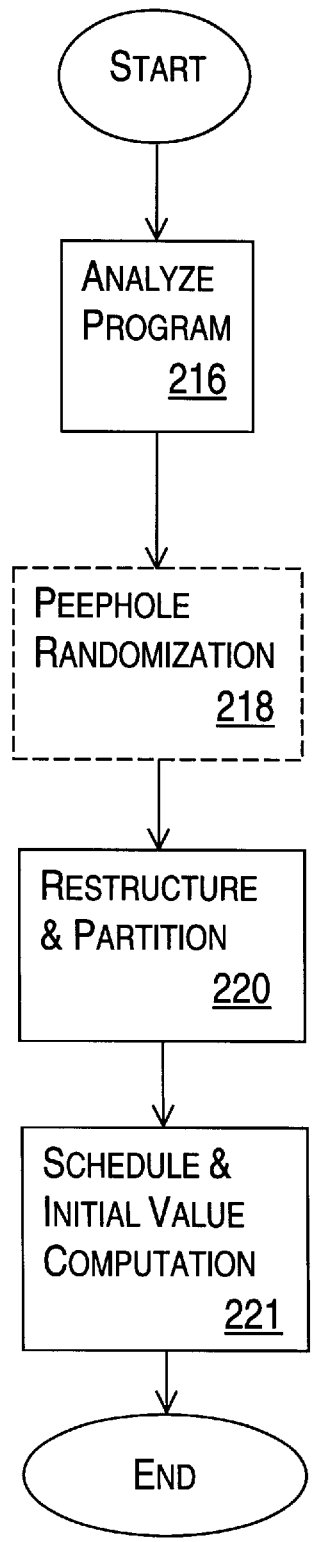
FIGS. 8a–8b are flow diagrams illustrating one embodiment of the operational flow of the obfuscation processor of FIG. 6.
Figure 8B:
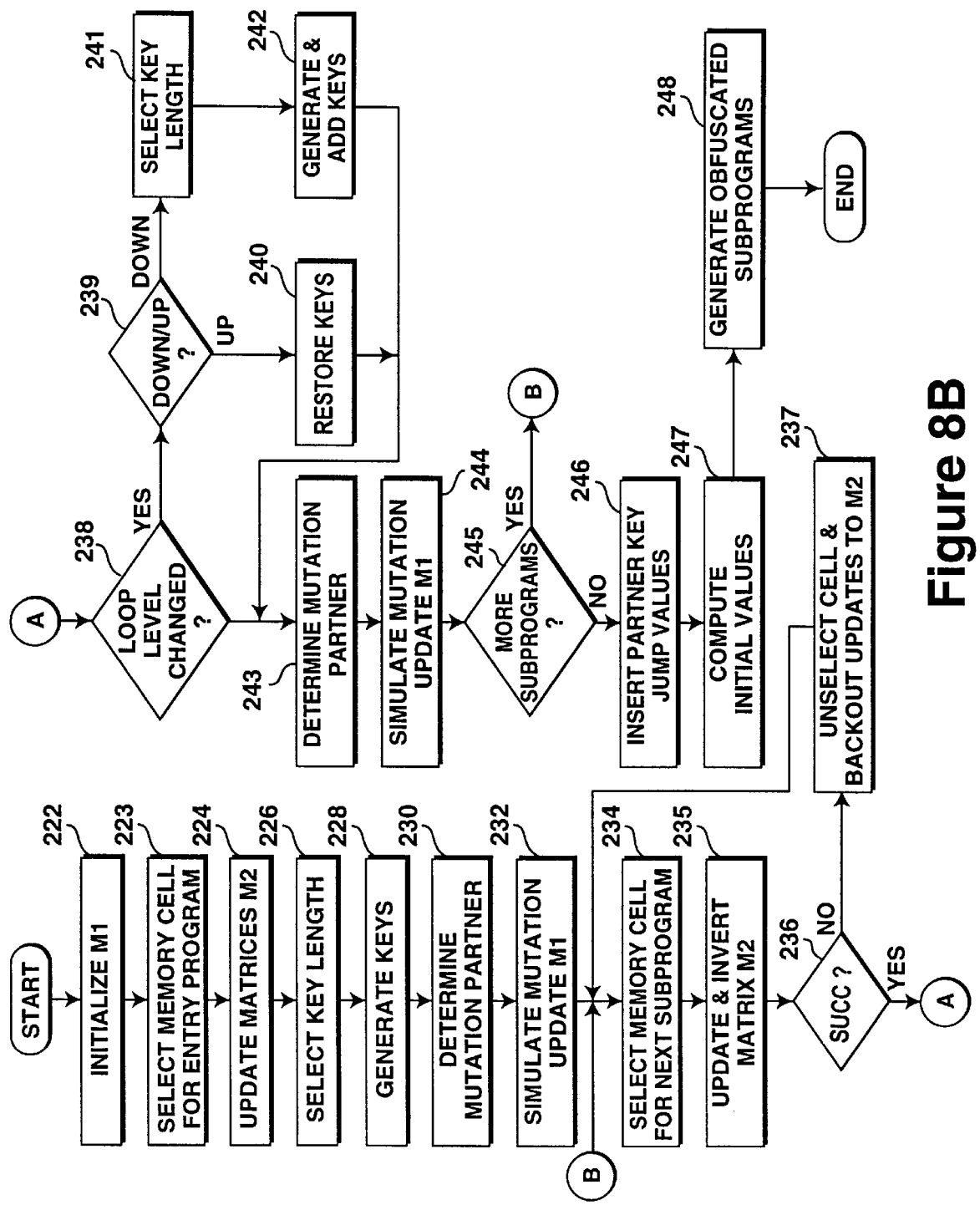

Referring now to FIGS. 8a–8b, two block diagrams illustrating one embodiment of obfuscation processor 214 are shown. For the illustrated embodiment, as shown in FIG.

8a in response to a program input (in object form), obfuscation processor 214 analyzes the program, step 216. In particular, obfuscation processor 214 analyzes branch flow of the program, identifying loops within the program, using conventional compiler optimization techniques known in the art. For the purpose of this application, any execution control transfer, such as a call and subsequent return, is also considered a "loop".

Next, obfuscation processor 214 may perform an optional step of peephole randomization, step 218. During this step, a peephole randomization pass over the program replaces code patterns with random equivalent patterns chosen from an optional dictionary of such patterns. Whether it is performed depends on whether the machine architecture of the instructions provide alternate ways of accomplishing the same task.

Then, obfuscation processor 214 restructures and partitions the program 200 into a number of equal size subprograms 204 organized by their loop levels, padding the subprograms 204 if necessary, based on the analysis results, step 220. Except for very simple programs with a single execution path, virtually all programs 200 will require some amount of restructuring. Restructuring includes e.g., removing as well as adding branches, and replicating instructions in different loop levels. Restructuring is also performed using conventional compiler optimization techniques.

Finally, obfuscation processor 214 determines the subprograms' plaintext appearance location schedule, and the initial state values for the various memory cells 202, step 221.

FIG. 8b illustrates step 221 in further detail. As shown, obfuscation processor 214 first initializes first working matrix M1, step 222. Then, obfuscation processor 214 selects a memory cell for the program's entry subprogram to appear in plaintext, step 223. In one embodiment, the memory cell 202 is arbitrarily selected (within the proper memory segment 201a or 201b). Once selected, obfuscation processor 214 updates the second working matrix M2, step 224.

Next, obfuscation processor 214 selects an appropriate key length based on the procedure's period requirement, by accessing key length table 212, step 226. Obfuscation processor 214 then generates an ordered set of pseudo-random keys based on the selected key length, step 228. For example, if key length equals 5 is selected among the key lengths that will provide a required period of 30, obfuscation processor 214 may randomly select 17, 18, 20, 24 and 16 as the ordered pseudo-random keys.

Next, obfuscation processor 214 determines the partner memory cells 202 for all memory cells 202 using the predetermined mutation partner identification function 206 and the next key in the selected set of ordered pseudo-random keys, step 230. Upon making the determination, obfuscation processor 214 simulates a mutation, and updates M1 to reflect the results of the mutation, step 232.

Once mutated, obfuscation processor 214 selects a memory cell for the next subprogram 204 to appear in plaintext, step 234. Having done so, obfuscation processor 214 updates M2, and incrementally inverts M2 using the Guassian Method, step 235. In one embodiment, instead of incremental inversion, obfuscation processor 214 may just verify M2 remains invertable instead. If M2 is not invertable, obfuscation processor 214 cancels the memory cell selection, and restores M2 to its prior state, step 237. Obfuscation processor 214 repeats steps 234–236 to select another memory cell 202. Eventually, obfuscation processor 214 becomes successful.

Once successful, obfuscation processor 214 determines if there was a loop level change, step 238. If there was a loop level change, obfuscation processor 214 further determines if the loop level change is a down level or up level change, i.e., the subprogram is an entry subprogram of a new loop level or a return point of a higher loop level, step 239. If the loop level change is "down", obfuscation processor 214 selects another appropriate key length based on the new loop's period requirement, accessing key length table 212, step 241. Obfuscation processor 214 then generates a new ordered set of pseudo-random keys based on the newly selected key length, step 242. The newly generated ordered set of pseudo-random keys becomes the "top" set of pseudo-random keys. On the other hand, if the loop level change id "up", obfuscation processor 214 restores an immediately "lower" set of pseudo random keys to be the "top" set of pseudo-random keys, step 240.

Upon properly organizing the "top" set of pseudo-random keys or upon determining there's no loop level change, obfuscation processor 214 again determines the partner memory cells 202 for all memory cells 202 using the predetermined mutation partner identification function 206 and the next key in the "top" set of ordered pseudo-random keys, step 243. Upon making the determination, obfuscation processor 214 simulates a mutation, and updates M1 to reflect the results of the mutation, step 244.

Once mutated, obfuscation processor 214 determines if there are more subprograms 204 to process, step 245. If there are more subprograms 204 to process, obfuscation processor 214 returns to step 234 and proceeds as described earlier. Otherwise, obfuscation processor 214 inserts the mutation partner identification function 206, the partner key to be used to identify mutation partner memory cells, the mutation function, the jump block, and the address of the next subprogram 204 into each of the obfuscated subprograms 204, step 246. Finally, obfuscation processor 214 computes the initial values of the various obfuscated subprograms 204, and outputs them, steps 247–248.

Figure 9:
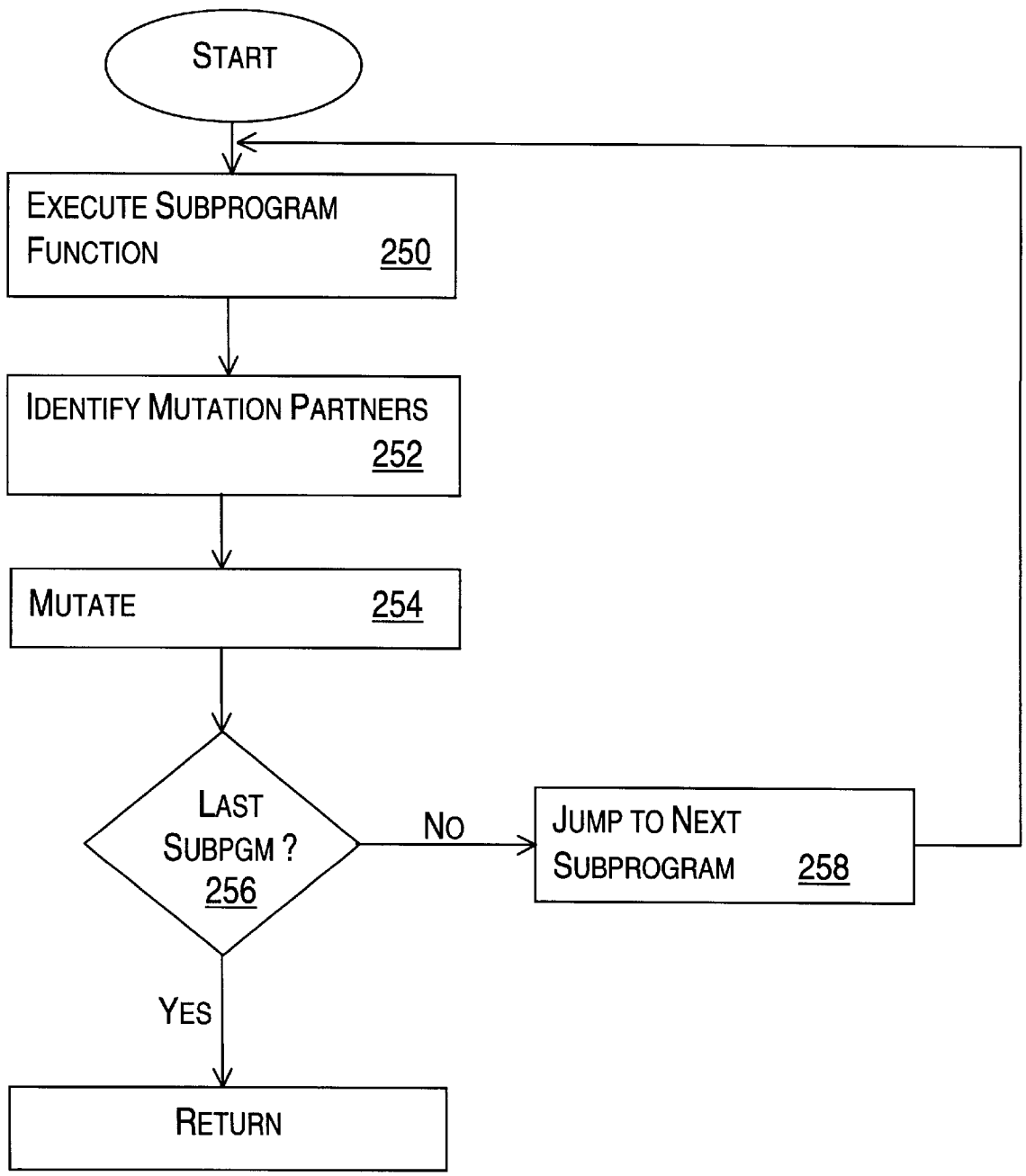
FIG. 9 is a flow diagram illustrating one embodiment of the operational logic of an obfuscated subprogram of the obfuscated program.

FIG. 9 illustrates one embodiment of the operational flow of an obfuscated subprogram 204. For the illustrated embodiment, obfuscated subprogram 204 first executes the functions of the original subprogram, step 250. For embodiments including additional and/or unrelated functions, they may be executed also. Then obfuscated subprogram 204 executes mutation partner identification function 206 to identify the mutation memory cell partners for all memory cells 202 using the stored partner key, step 252. Having identified the mutation partners, obfuscated subprogram 204 executes mutation function 207 to mutate the memory cells based on the identified partnership.

Next, depending on whether obfuscated subprogram 204 is the last subprogram in an execution pass, obfuscated subprogram 204 either jumps to the next obfuscated subprogram (which should be in plaintext) or returns to the "caller". Note that if obfuscated subprogram 204 returns to the "caller", all other obfuscated subprograms 204 are in their respective initial states steps 256 and 258.

FIGS. 10–14 illustrate a sample application of this second aspect of the present invention. FIG. 10 illustrates a sample security sensitive program 200 having six subprograms SPGM0–SPGM5 implementing a simple single level logic, for ease of explanation, with contrived plaintext values of "000", "001", "010", "011", "100" and "111". Thus, the required period is 6. For ease of explanation, a keylength of one will be used, and the pseudo-random key selected is 3. Furthermore, the mutation partnership identification function is simply Partner Cell ID=Cell ID+3, i.e., cell 0 always pairs with cell 3, cell 1 pairs with cell 4, and cell 2 pairs with cell 5.

FIG. 10 further illustrates at invocation (mutation 0), memory cells (c0–c5) contains initial values (iv0–iv5), as reflected by M1. Assuming, cell c0 is chosen for SPGM0, M2 is updated to reflect that the Boolean function for recovering the plaintext of SPGM0 is simply iv0. FIG. 10 further illustrates the values stored in memory cells (c0–c5) after the first mutation. Note that for the illustrated mutation technique, only the content of the memory cells (c3–c5) have changed. M1 is updated to reflect the current state. Assuming, cell c3 is chosen for SPGM1, M2 is updated to reflect that the Boolean function for recovering the plaintext of SPGM1 is simply iv0 XOR iv3. Note that for convenience of manipulation, the columns of M2 have been swapped.

FIG. 11 illustrates the values stored in memory cells (c0–c5) after the second, third and fourth mutations. As shown, the content of half of the memory cells (c0–c5) are changed alternatingly after each mutation. In each case, M1 is updated to reflect the current state. Assuming, cells c1, c4 and c2 are chosen for SPGM2, SPGM3 and SPGM4 respectively after the second, third and fourth mutations respectively, in each case M2 is updated to reflect that the Boolean functions for recovering the plaintexts of SPGM2, SPGM3 and SPGM4, i.e., iv4, iv1, and iv2 XOR iv5.

FIG. 12 illustrates the values stored in memory cells (c0–c5) after the fifth mutation. As shown, the content of memory cells (c3–c5) are changed as in previous odd rounds of mutation. M1 is updated to reflect the current state. Assuming, cell c5 is chosen for SPGM5, M2 is updated to reflect that the Boolean function for recovering the plaintext of SPGM5 is iv5.

FIG. 13 illustrates how the initial values iv0–iv5 are calculated from the inverse of M2, since M2×ivs=SPGMs, ivs=M2$^{-1}$×SPGMs. Note that a "1" in M2$^{-1}$ denotes the corresponding SPGM is selected, whereas a "0" in M2$^{-1}$ denotes the corresponding SPGM is not selected, for computing the initial values (iv0–iv5).

Figure 14:
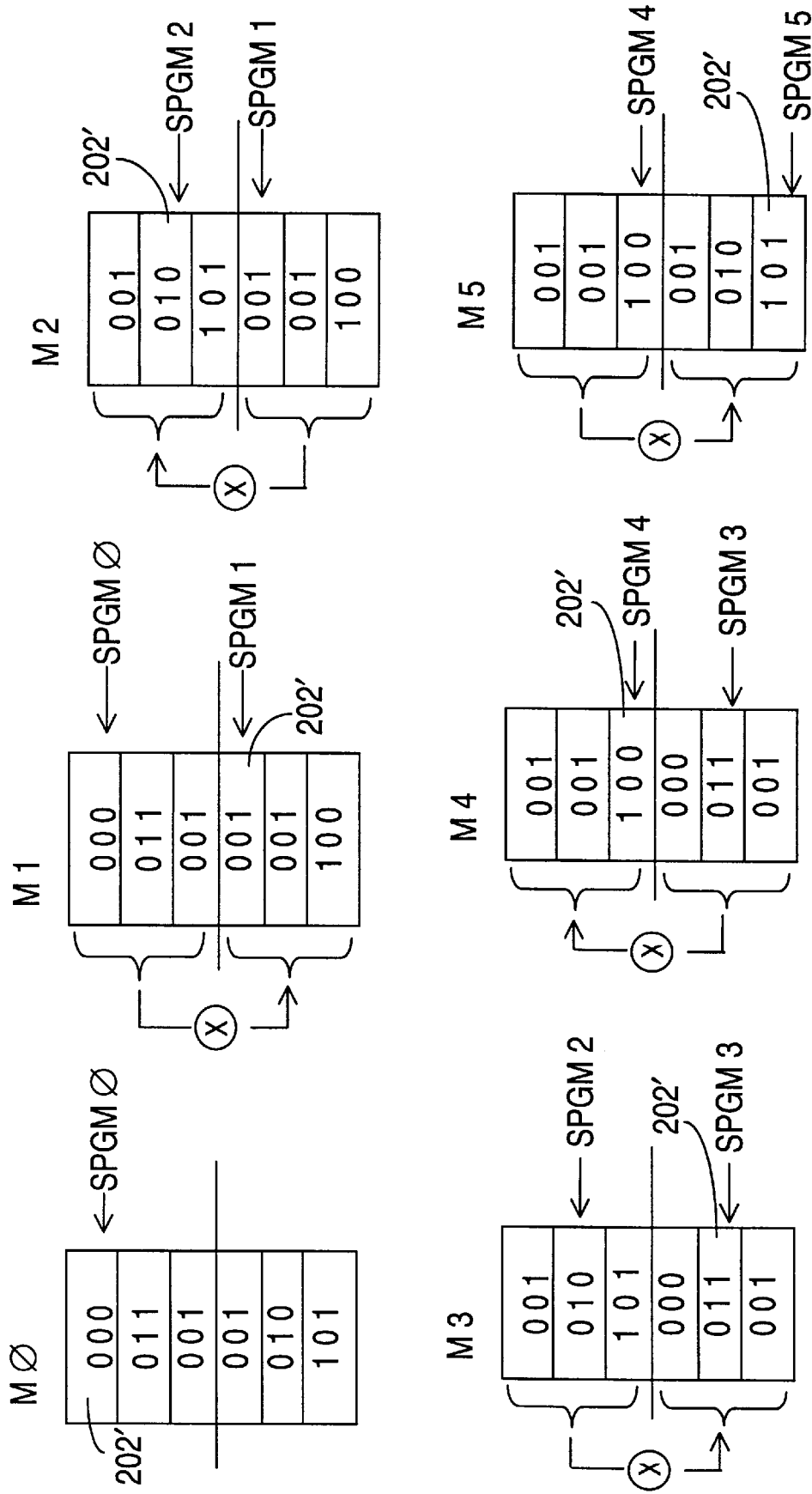

FIG. 14 illustrates the content of the memory cells of the above example during execution. Note that at any point in time, at most only two of the subprograms are observable in their plaintext forms. Note that the pairing of mutation partners is fixed only because of the single pseudo-random key and the simple mutation partner function employed, for ease of explanation. Note also that with another mutation, the content of the memory cells are back to their initial states. In other words, after each execution pass, the subprograms are in their initial states, ready for another invocation.

As will be appreciated by those skilled in the art, the above example is unrealistically simple for the purpose of explanation. The plaintext of a subprogram contains many more "0" and "1" bits, making it virtually impossible to distinguish memory cell storing an obfuscated subprogram in a mutated state from a memory cell storing an obfuscated subprogram in plaintext form. Thus, it is virtually impossible to infer the plaintext appearance location schedule from observing the mutations during execution.

Figure 15:
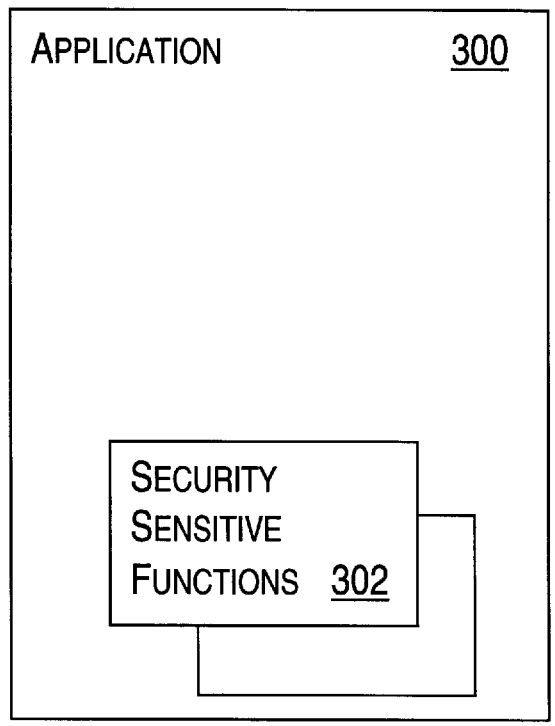
FIG. 15 is a block diagram illustrating a third aspect of the present invention for making a security sensitive application tamper resistant.

FIG. 15 illustrates a third aspect of the present invention. In accordance with this aspect of the present invention, security sensitive application 300 may be made tamper resistant by isolating its security sensitive functions 302 and making them tamper proof by incorporating the first and/or second aspects of the present invention described above.

In employing the above described second aspect of the present invention, different sets of pseudo-random keys will produce a different pattern of mutations, even with the same mutation partner identification function. Thus, copies of the security sensitive application installed on different systems may be made unique by employing a different pattern of mutations through different sets of pseudo-random keys. Thus, the security sensitive applications installed in different systems are further resistant from class attack, even if the obfuscation scheme is understood from observation on one system.

Figure 16:
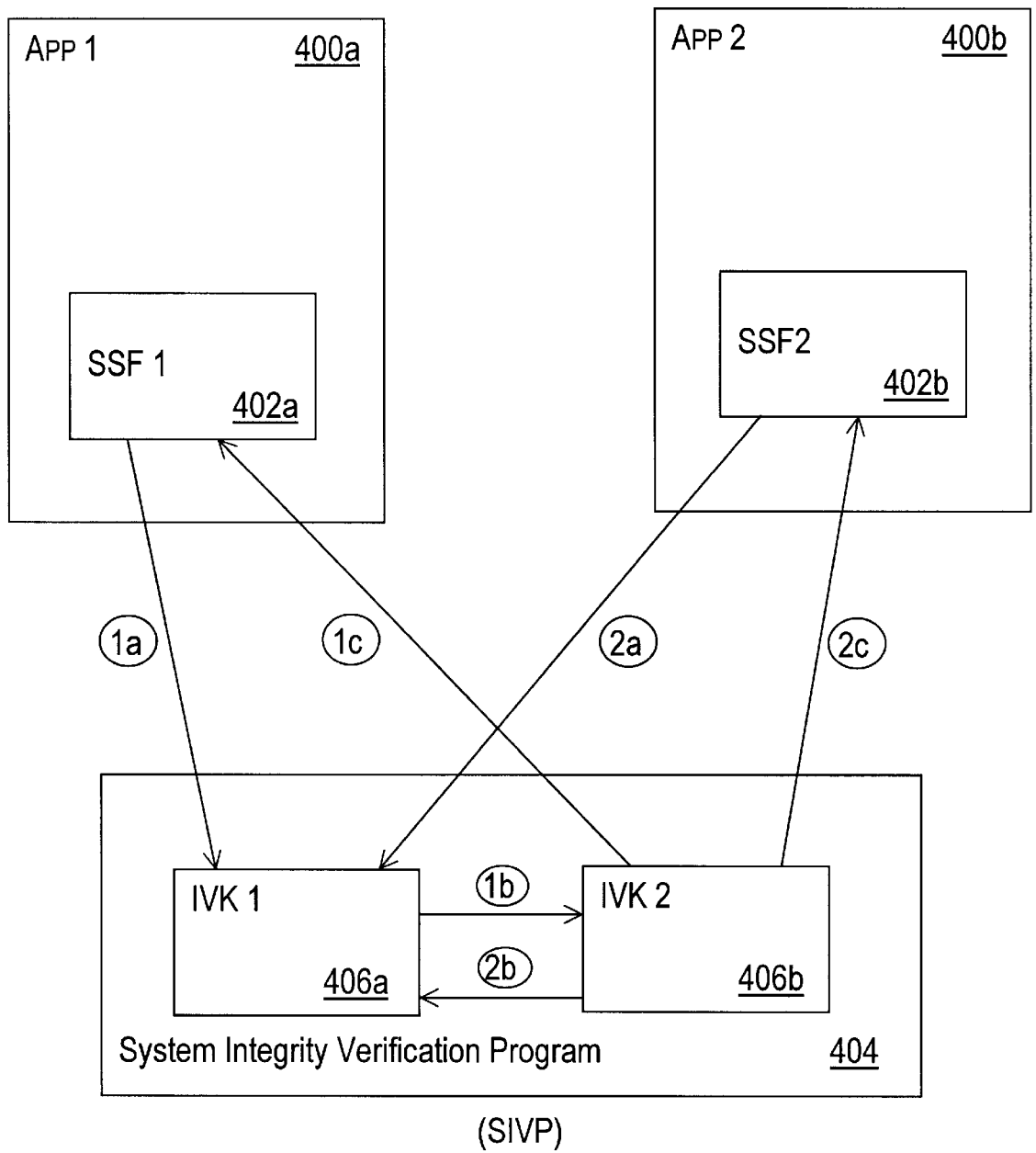
FIG. 16 is a block diagram illustrating a fourth aspect of the present invention for making a security sensitive system tamper resistant.

FIG. 16 illustrates a fourth aspect of the present invention. In accordance with this aspect of the present invention, a security sensitive system 400 may be made tamper resistant by making its security sensitive applications 400a and 400b tamper resistant in accordance with the first, second and/or third aspects of the present invention described above. Furthermore, security of system 400 may be further strengthened by providing system integrity verification program (SIVP) 404 having a number of integrity verification kernels (IVKs). For the illustrated embodiment, a first and a second level IVK 406a and 406b. First level IVK 406a has a published external interface for other tamper resistant security sensitive functions (SSFs) 402a–402b of the security sensitive applications 400a–400b to call. Both IVKs are made tamper resistant in accordance with the first and second aspects of the present invention described earlier. Together, the tamper resistant SSFs 402a–402b and IVKs 406a–406b implement an interlocking trust mechanism.

In accordance with the interlocking trust mechanism, for the illustrated embodiment, tamper resistant SSF1 and SSF2 402a–402b are responsible for the integrity of security sensitive applications 400a–400b respectively. IVK1 and IVK2 406a–406b are responsible for the integrity of SIVP 404. Upon verifying the integrity of security sensitive application 400a or 400b for which it is responsible, SSF1/SSF2 402a–402b will call IVK1 406a. In response, IVK1 406a will verify the integrity of SIVP 404. Upon successfully doing so, IVKI 406a calls IVK2 406b, which in response, will also verify the integrity of SIVP 404.

Thus, in order to tamper with security sensitive application 400a, SSF1 402a, IVK1 406a and IVK2 406b must be tampered with at the same time. However, because IVK1 and IVK2 406a–406b are also used by SSF2 and any other SSFs on the system, all other SSFs must be tampered with at the same time.

Figure 17:
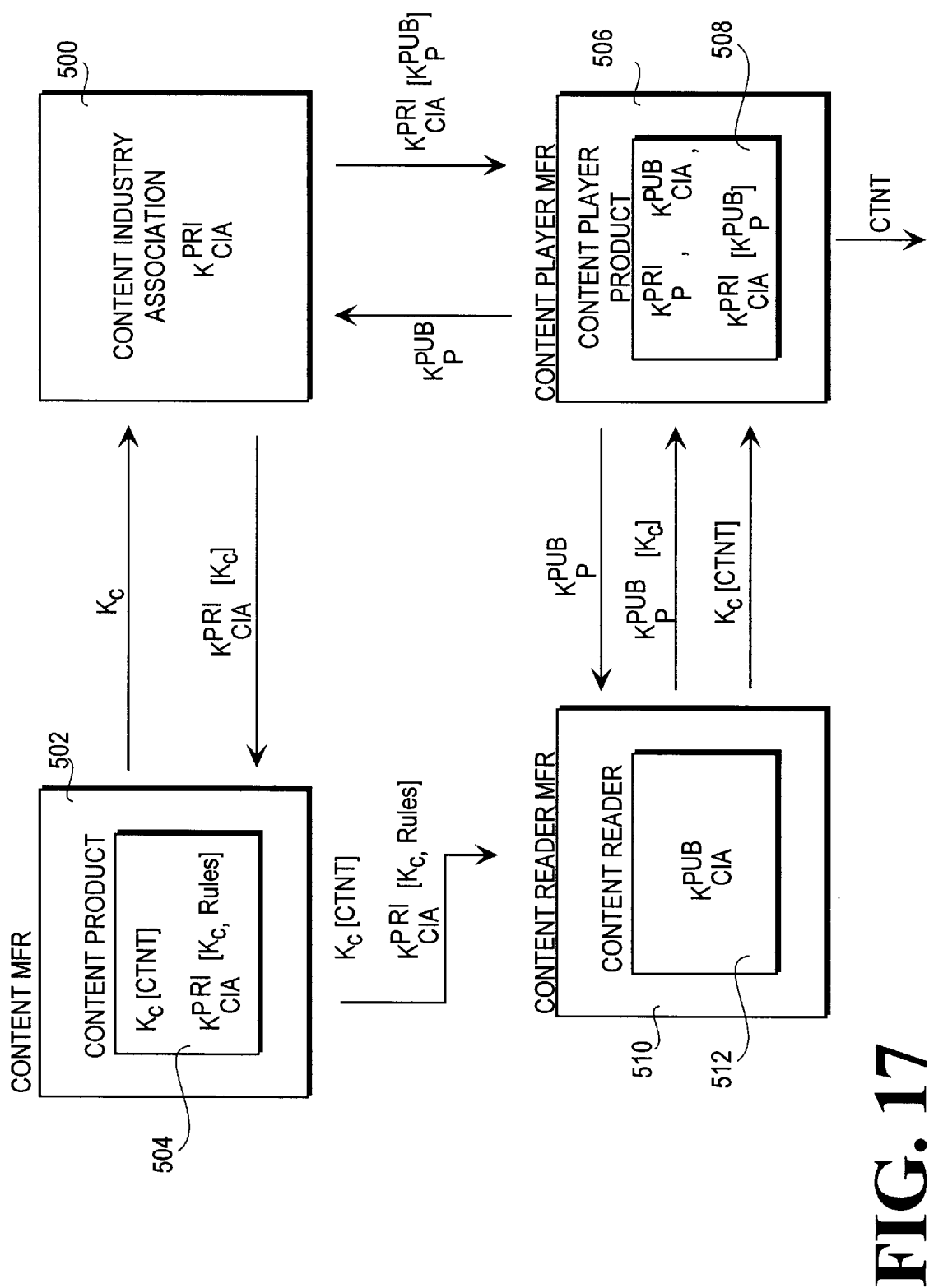
FIG. 17 is a block diagram illustrating a fifth aspect of the present invention for making security sensitive industry tamper resistant.

FIG. 17 illustrates a fifth aspect of the present invention. In accordance with this aspect of the present invention, content industry association 500, content manufacturers 502, content reader manufacturers 510 and content player manufactures 506 may jointly implement a coordinated encryption/decryption scheme, with content players 508 manufactured by content player manufacturers 506 employing playing software that includes content decryption functions made tamper resistant in accordance with the above described various aspects of the present invention.

Content industry association 500 owns and holds a secret private encryption key $Kcia^{pri}$. Content industry association 500 encrypts content manufacturer's secret content encryption key Kc and content player manufacturer's public encryption key $Kp^{pub}$ for the respective manufacturers 502 and 506 using $Kcia^{pri}$, i.e., $Kcia^{pri}[Kc]$ and $Kcia^{pri}[Kp^{pub}]$.

Content manufacturer 502 encrypts its content product Kc[ctnt] and includes with the content product $Kcia^{pri}[Kc]$. Content reader manufacturer 510 includes with its content reader product 512 the public key of content industry association $Kcia^{pub}$, whereas content player manufacturer 506 includes with its content player product 508 content player manufacturer's secret private play key $Kp^{pri}$, content industry association's public key $Kcia^{pub}$, and the encrypted content player public key $Kcia^{pri}[Kp^{pub}]$.

During operation, content reader product 512 reads encrypted content $Kc[ctnt]$ and the encrypted content encryption key $Kcia^{pri}[Kc]$. Content reader product 512 decrypts Kc using $Kcia^{pub}$. Concurrently, content player product 508 recovers its public key $Kp^{pub}$ by decrypting $Kcia^{pri}[Kp^{pub}]$ using content industry association's public key $Kcia^{pub}$. Content reader product 512 and content player product 508 are also in communication with each other. Upon recovering its own public key, content player product 508 provides it to content reader product 512. Content reader product 512 uses the provided player public key $Kp^{pub}$ to encrypt the recovered content encryption key Kc, generating $Kp^{pub}[Kc]$, which is returned to content player product 508. In response, content player product 508 recovers content encryption key Kc by decrypting $Kp^{pub}[Kc]$ using its own private key $Kp^{pri}$.

Thus, as content reader product 512 reads encrypted content $Kc[ctnt]$, and forwards them to content player product 508, content player product 508 decrypts them with the recovered Kc, generating the unencrypted content (ctnt). In accordance with the above described aspects of the present invention, the decryption functions for recovering the content player's manufacturer's public key, and recovering the content encryption key Kc are made tamper resistant.

As will be appreciated by those skilled in the art, in addition to being made tamper resistant, by virtue of the interlocking trust, tampering with the content player product's decryption functions will require tampering of the content industry association, content manufacturer and content reader manufacturer's encryption/decryption functions, thus making it virtually impossible to compromise the various encryption/decryption functions' integrity.

As will be also appreciated by those skilled in the art, a manufacturer may play more than one role in the above described tamper resistant industry security scheme, e.g., manufacturing both the content reader and the content player products, as separate or combined products.

Figure 18:
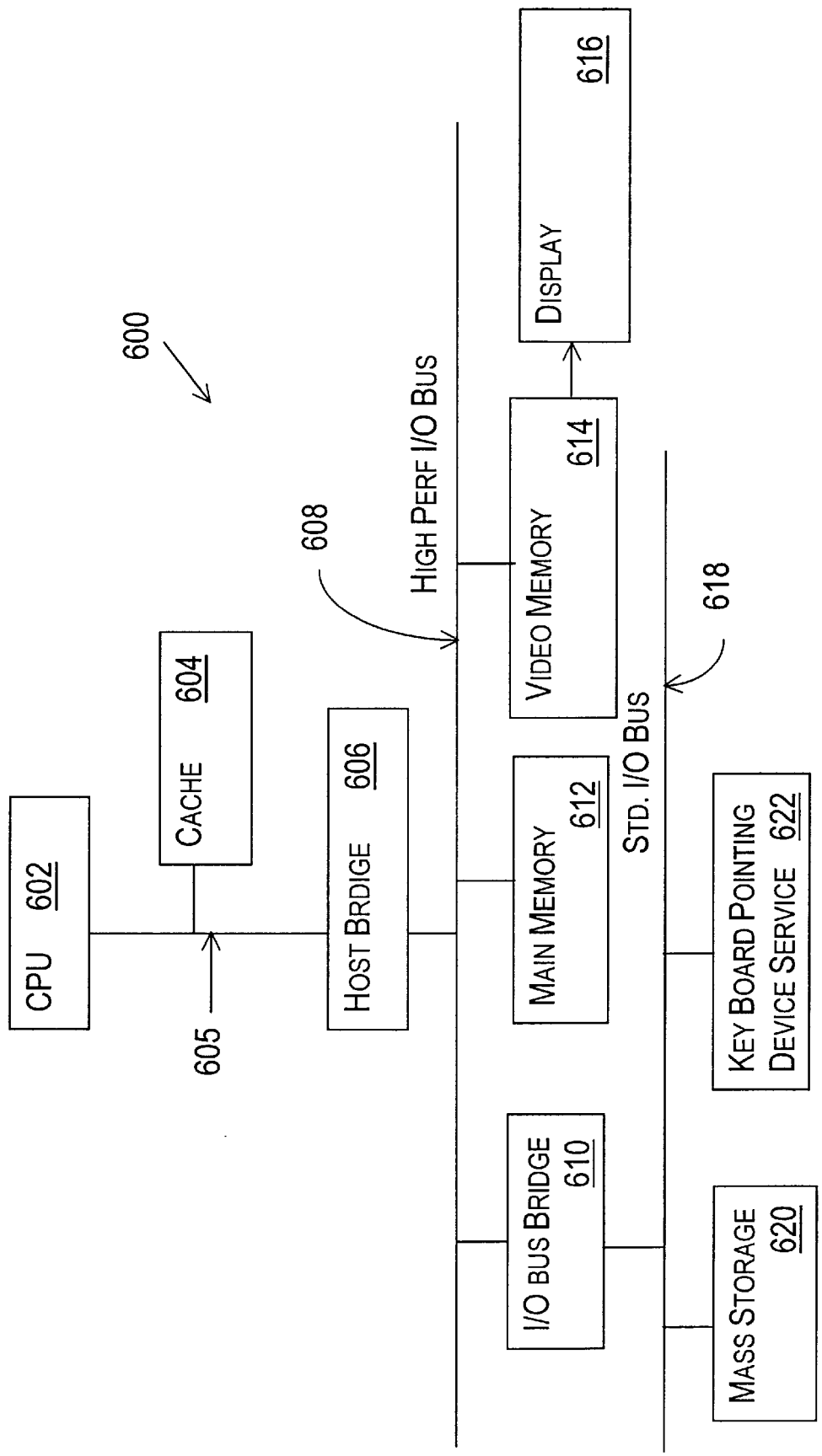
FIGS. 18–19 are block diagrams illustrating an example computer system and an embedded controller suitable for programming with the various aspects of the present invention.

FIG. 18 illustrates a sample computer system suitable to be programmed with security sensitive programs/applications with or without SIVP, including an industry wide security mechanism, made tamper resistant in accordance with the first, second, third, fourth and/or fifth aspects of the present invention. Sample computer system 600 includes CPU 602 and cache memory 604 coupled to each other through processor bus 605. Sample computer system 600 also includes high performance I/O bus 608 and standard I/O bus 618. Processor bus 605 and high performance I/O bus 608 are bridged by host bridge 606, whereas high performance I/O bus 608 and standard I/O bus 618 are bridged by bus bridge 610. Coupled to high performance I/O bus 608 are main memory 612, and video memory 614. Coupled to video memory 614 is video display 616. Coupled to standard I/O bus 618 are mass storage 620, and keyboard and pointing devices 622.

These elements perform their conventional functions. In particular, mass storage 620 is used to provide permanent storage for the executable instructions of the various tamper resistant programs/applications, whereas main memory 612 is used to temporarily store the executable instructions tamper resistant programs/applications during execution by CPU 602.

Figure 19:
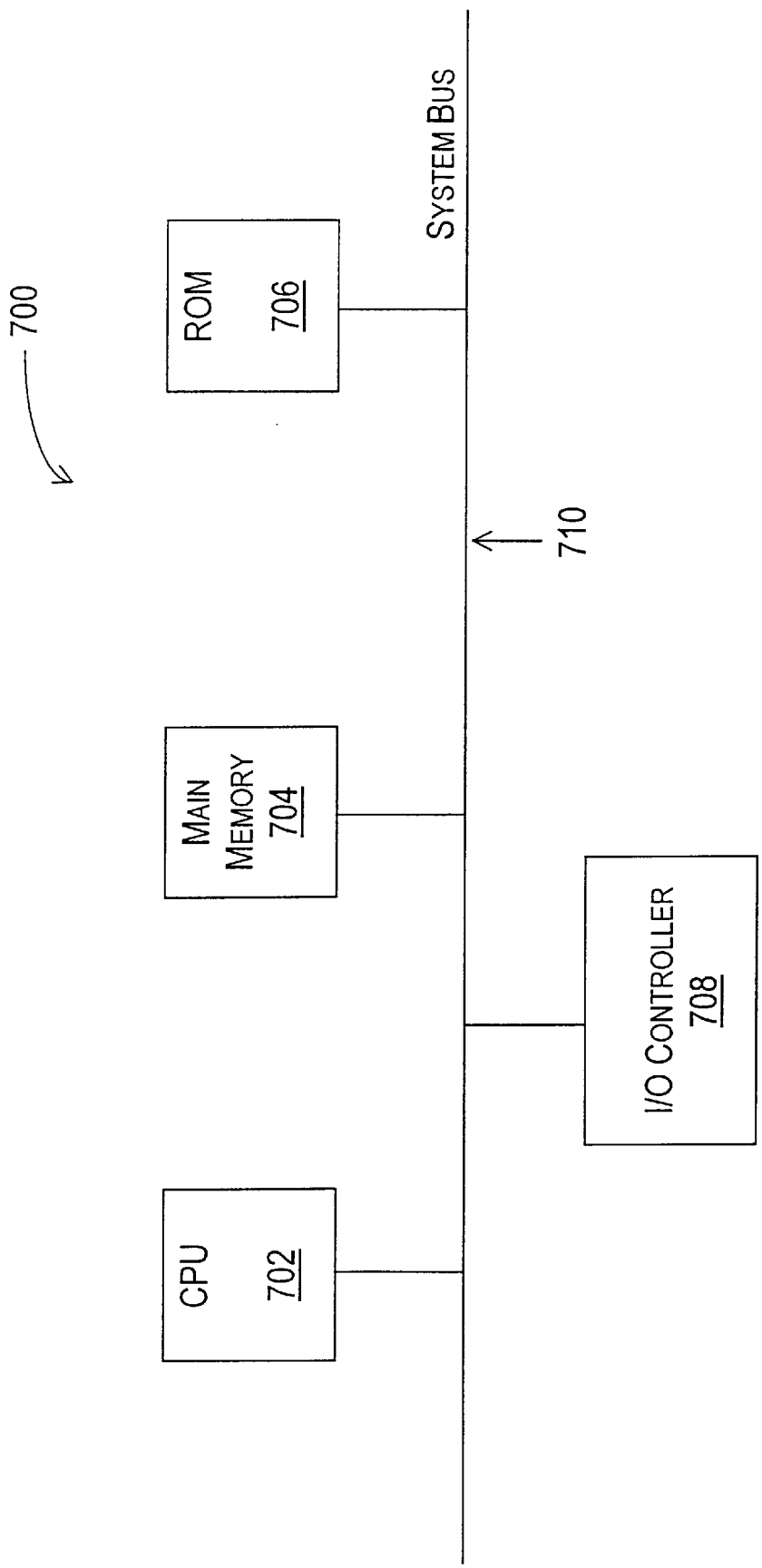

FIG. 19 illustrates a sample embedded controller suitable to be programmed with security sensitive programs for a security sensitive apparatus, made tamper resistant in accordance with the first, second, third, fourth and/or fifth aspects of the present invention. Sample embedded system 700 includes CPU 702, main memory 704, ROM 706 and I/O controller 708 coupled to each other through system bus 710. These elements also perform their conventional functions. In particular, ROM 706 may be used to provide permanent and execute-in-place storage for the executable instructions of the various tamper resistant programs, whereas main memory 704 may be used to provide temporary storage for various working data during execution of the executable instructions of the tamper resistant programs by CPU 702.

Thus, various tamper resistant methods and apparatus have been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
    an execution unit for executing programming instructions; and
    a storage medium coupled to the execution unit, having stored therein a plurality of programming instruction blocks to be executed by the execution unit during operation, the programming instruction blocks operating on corresponding subparts of a secret distributed among them, and the execution being distributed over a period of time.

2. The apparatus as set forth in claim 1, wherein the programming instruction blocks jointly implement a decryption function, and the secret is a private key.

3. The apparatus as set forth in claim 1, wherein one or more of the programming instruction blocks further perform one or more unrelated tasks to further obscure the operations on the subparts of the secret.

4. A machine implemented method for executing a program that operates on a secret in a tamper resistant manner, the method comprising the steps of:
    a) executing a first unrolled subprogram of the program at a first point in time, with the first unrolled subprogram operating on a first subpart of the secret; and
    b) executing a second unrolled subprogram of the program at a second point in time, with the second unrolled subprogram operating on a second subpart of the secret.

5. The method as set forth in claim 4, wherein the first and second unrolled subprograms are unrolled subprograms of a decryption function; and the secret is a private key.

6. The method a s set forth in claim 4, wherein
    step (a) further includes the first unrolled subprogram performing at least a first unrelated task; and
    step (b) further includes the second unrolled subprogram performing at least a second unrelated task;
    wherein said at least first and second unrelated tasks are performed to further obscure the first and second unrolled subprograms' operation on the first and second subparts of the secret.

7. An apparatus comprising:
    an execution unit for executing programming instructions; and
    a storage medium having stored therein a plurality of programming instructions to be executed by the execution unit during operation, wherein when executed, in response to a secret being provided, the programming instructions partition the secret into a plurality of subparts, and generate a plurality of programming instruction blocks that operate on the subparts.

8. The apparatus as set forth in claim 7, wherein the apparatus further includes a library having an entry programming instruction block, and a basis programming instruction block, to be accessed by the programming instructions in generating the programming instruction blocks.

9. The apparatus as set forth in claim 7, wherein during execution, the entry programming instruction block initializes a table of values for use by the basis programming blocks to operate on their corresponding subparts of the secret; and the basis programming blocks' operations on their corresponding subparts of the secret, include looking up values initialized in the table using the basis programming blocks' corresponding subparts of the secret.

10. A machine implemented method for generating a tamper resistant program to operate on a secret, the method comprising the steps of:

a) receiving the secret;
b) partitioning the secret into a plurality of subparts; and
c) generating a plurality of subprograms to correspondingly operate on the subparts of the secret.

11. The method as set forth in claim 10, wherein step (c) includes accessing a library having an entry subprogram, and a basis subprogram to generate the subprograms.

12. The method as set forth in claim 11, wherein during execution, the entry subprogram initializes a table of values for use by the basis subprograms to operate on their corresponding subparts of the secret; and the basis subprograms' operations on their corresponding subparts of the secret, include looking up values initialized in the table using the basis subprograms' corresponding subparts of the secret.

13. An apparatus comprising:

an execution unit for executing programming instructions; and a storage medium having stored therein a plurality of programming instruction blocks to be executed by the execution unit, the programming instruction blocks being stored in a mutated form, except for at least one programming instruction block, which is stored in a plaintext for m, wherein the mutated programming instruction blocks are recovered into the plaintext form during execution on an as needed basis.

14. The apparatus as set forth in claim 13, wherein each programming instruction block includes a first programming instruction sub-block for performing a task, a second programming instruction sub-block for computing mutation partners for a plurality of memory cells, a key to be employed in said computation of mutation partners, a third programming instruction sub-block for mutating memory cells in accordance with the computed mutation partnering, and a fourth programming instruction sub-block for transferring execution control to another programming instruction block.

15. The apparatus as set forth in claim 14, wherein the first programming instruction sub-block operates on a subpart of a secret.

16. The apparatus as set forth in claim 14, wherein the second programming instruction sub-block computes the mutation partnering by performing a logical XOR operation on a memory cell's identifier and the key.

17. The apparatus as set forth in claim 14, wherein the key is a member of an ordered set of pseudo-randomly selected members, the ordered set having a set size that will provide a required period for a pattern of memory cell mutations, with the memory cells being partnered for mutation in accordance with the computed mutation partnering using the key.

18. The apparatus as set forth in claim 14, wherein the memory cells are divided into two memory cell groups, and pair-wise partnered by the second programming instruction sub-block, with the partnered memory cells being in different group; and the third programming instruction sub-block performs a logical XOR operation on the contents of each pair of partnered memory cells, and alternating between the two memory cell groups for odd and even mutation rounds, in storing the results of the logical XOR operations.

19. A machine implemented method for executing a program, the method comprising:

a) executing a first of a plurality of subprograms generated to obfuscate the program;

b) computing mutation partners for a plurality of memory cells storing the plurality of subprograms, using a key, the subprograms being stored initially in the memory cells in a mutated form, except for at least one memory cell, which is stored initially in a plaintext form;

c) mutating the memory cells in accordance with the computed mutation partnering to recover a second of the plurality of subprograms for execution.

20. The method as set forth in claim 19, wherein the first and second subprograms operate on a first and a second subpart of a secret.

21. The method as set forth in claim 19, wherein step (b) comprises performing a logical XOR operation on a memory cell's identifier and the key for each memory cell.

22. The method as set forth in claim 19, wherein the key is a member of an ordered set of pseudo-randomly selected members, the ordered set having a set size that will provide a required period for a pattern of memory cell mutations, with the memory cells being partnered for mutation in accordance with the computed mutation partnering using the key.

23. The method as set forth in claim 19, wherein step (c) comprises performing logical XOR operations on the contents of memory cells of a first memory cell group and the contents of memory cells of a second memory cell group, and storing the results of the logical XOR operations into the first memory cell group if step (c) is being performed for an odd number of times, and the second memory cell group if step (c) is being performed for an even number of times.

24. The method as set forth in claim 19, wherein the method further comprises the steps of:

d) executing the second of the plurality of subprograms;
e) computing mutation partners for the plurality of memory cells; and
f) mutating the memory cells in accordance with the computed mutation partnering to mutate the first of the plurality of subprograms, and recover a third of the plurality of subprograms for execution.

25. An apparatus comprising:

an execution unit for executing programming instructions; and a storage medium having stored therein a first plurality of programming instructions to be executed by the execution unit, wherein when executed, in response to a program input, the first plurality of programming instructions generate a plurality of subprograms for the program to obfuscate the program, the subprograms being generated in a mutated form, except for at least one program, which is generated in a plaintext form, the subprograms being further generated with logic to recover the subprograms in plaintext form on an as needed basis.

26. The apparatus as set forth in claim 25, wherein the storage medium further having stored therein a table of keylengths to be accessed by the first plurality of programming instructions in generating the subprograms, the keylengths denoting sizes of ordered sets of pseudo-randomly selected members that will provide various required mutation periods.

27. The apparatus as set forth in claim 25, wherein the storage medium further having stored therein a second plurality of programming instructions to be incorporated into each of the generated subprograms by the first plurality of programming instructions for identifying mutation partners for a plurality of memory cells storing the subprograms, for a mutation round, using a key, the key being a member of an ordered set of pseudo-randomly selected members that will provide a mutation period required by the generated subprograms.

28. The apparatus as set forth in claim 25, wherein the storage medium further having stored therein a second plurality of programming instructions to be incorporated into each of the generated subprograms by the first plurality of programming instructions for mutating memory cells storing the generated subprograms in accordance with computed mutation partnerings for a mutation round.

29. The apparatus as set forth in claim 25, wherein the first plurality of programming instructions include logic for analyzing the program for branch flow.

30. The apparatus as set forth in claim 25, wherein the first plurality of programming instructions include logic for performing peephole randomization on the program.

31. The apparatus as set forth in claim 25, wherein the first plurality of programming instructions include restructuring and partitioning the program into the subprograms.

32. The apparatus as set forth in claim 25, wherein the first plurality of programming instructions include logic for scheduling memory cells for the generated subprograms to be recovered in the plaintext form, and determining the appropriate initial values for the memory cells.

33. The apparatus as set forth in claim 32, wherein the first plurality of programming instructions include logic for determining a mutation period requirement for the program, a keylength for the required mutation period, the keylength denoting a set's set size, the set being an ordered set of pseudo-randomly selected members that will provide the required mutation period.

34. The apparatus as set forth in claim 32, wherein the first plurality of programming instructions include logic for selecting a memory cell for a generated subprogram to be recovered in the plaintext form, and determining a Boolean function for recovering the generated subprogram in the plaintext form in terms of initial state values of the memory cells used for storing the generated subprograms.

35. The apparatus as set forth in claim 32, wherein the first plurality of programming instructions include logic for determining mutation partners for a plurality of memory cells storing the generated subprograms, using a key of an ordered set of pseudo-randomly selected keys, simulating memory cell mutations in accordance with the determined mutation partnering, and determining a plurality of Boolean functions for the memory cells, the Boolean functions expressing the post mutation states of the memory cells in terms of the memory cells' initial values.

36. A machine implemented method for generating a plurality of subprograms for a program to obfuscate the program, the method comprising the steps of:
    a) analyzing the program for branch flow;
    b) restructuring and partitioning the program into a plurality of subprograms; and
    c) determining a schedule in terms of a plurality of memory cells for recovering the subprograms in a plaintext form for execution, and initial state values for the memory cells to store the subprograms in the memory cells in a mutated form, except for at least one subprogram, which is stored in one of the memory cells in the plaintext form.

37. The machine as set forth in claim 36, wherein step (a) further includes performing peephole randomization on the program.

38. The method as set forth in claim 36, wherein step (c) includes determining a mutation period requirement for the program, a keylength for the required mutation period, the keylength denoting a set's set size, the set being an ordered set of pseudo-randomly selected members that will provide the required mutation period.

39. The method as set forth in claim 36, wherein step (c) includes selecting a memory cell for a generated subprogram to be recovered in the plaintext form, and determining a Boolean function for recovering the generated subprogram in the plaintext form in terms of initial state values of the memory cells used for storing the generated subprograms.

40. The method as set forth in claim 36, wherein step (c) includes determining mutation partners for a plurality of memory cells storing the generated subprograms, using a key of an ordered set of pseudo-randomly selected keys, simulating memory cell mutations in accordance with the determined mutation partnering, and determining a plurality of Boolean functions for the memory cells, the Boolean functions expressing the post mutation states of the memory cells in terms of the memory cells' initial values.

41. The method as set forth in claim 36, wherein the method further includes step (d) inserting a function and a key into each of the generated subprograms, the function being used for identifying mutation partners for a plurality of memory cells storing the subprograms, for a mutation round, using the key, the key being a member of an ordered set of pseudo-randomly selected members that will provide a mutation period required by the generated subprograms.

42. The method as set forth in claim 36, wherein the method further includes step (d) inserting a function into each of the generated subprograms for mutating memory cells storing the generated subprograms in accordance with computed mutation partnerings for a mutation round.

43. An apparatus comprising:
    an execution unit for executing programming instructions;
    a storage medium having stored therein a first and a second plurality of programming instructions to be executed by the execution unit, the first and second plurality of programming instructions implementing an application with the first plurality of programming instructions implementing a security sensitive function of the application and the second plurality of programming instructions implementing a non-security sensitive function of the application, the first plurality of programming instructions having incorporated a first defensive technique of distributing a secret in space and in time and/or a second defensive technique of obfuscation to render the first plurality of programming instructions virtually unobservable and unmodifiable during execution.

44. The apparatus as set forth in claim 43, wherein the first plurality of programming instructions incorporated the second defensive technique of obfuscation, including one or more unique ordered sets of pseudo-randomly selected members for generating one or more patterns of memory cell mutations, rendering the application unique from other copies of the application installed on other apparatus.

45. An apparatus comprising:
an execution unit for executing programming instructions;
a storage medium having stored therein a first, a second, a third, and a fourth plurality of programming instructions to be executed by the execution unit, the first and second plurality of programming instructions implementing a first and a second integrity verification function for a first and a second application respectively, whereas the third and fourth programming instructions implement a third and a fourth integrity verification function for a system integrity verification program, all four pluralities of programming instructions having incorporated defensive techniques rendering them tamper resistant, the four pluralities of programming instructions jointly implementing an interlocking trust mechanism, requiring the first and the second pluralities of programming instructions each to cooperate with both the third and fourth pluralities of programming instructions to complete an integrity verification on the apparatus.

46. A machine implemented method for verifying integrity on an apparatus, the method comprising the steps of:
a) a first and a second tamper resistant integrity verification function of a first and a second application of the apparatus individually requesting a third tamper resistant integrity verification function of a system integrity verification program to jointly perform integrity verification with the first and second tamper resistant integrity verification functions respectively;
b) in response, the third tamper resistant integrity verification function calling a fourth tamper resistant integrity verification function of the system integrity verification program to jointly perform the requested integrity verifications;
c) the fourth tamper resistant integrity verification function providing the first and the second tamper resistant integrity verification functions with respective results of the requested integrity verifications.

47. An apparatus comprising:
an execution unit for executing programming instructions;
a storage medium having stored therein a first and a second plurality of programming instructions to be executed by the execution unit, and a first secret private key, the first and second pluralities of programming instructions implementing a first and a second tamper resistant decryption function respectively,
the first tamper resistant decryption function being used for recovering a first public key asymmetric to the first secret private key using a second public key, the first public key having been previously encrypted using a second secret private key asymmetric to the second public key,
the second tamper resistant decryption function being used for recovering a content encryption key using the first secret private key, the content encryption key having been previously encrypted using the first public key.

48. The apparatus as set forth in claim 47, wherein the storage medium further having stored therein a third plurality of programming instructions to be executed by the execution unit, the third plurality of programming instructions implementing a third decryption function for recovering content using the recovered content encryption key, the content having been previously encrypted using the content encryption key.

49. A machine implemented method for recovering content, the method comprising the steps of:
a) recovering a first public key using a second public key, the first and second public keys having a first and a second asymmetric private key respectively, the first public key having been previously encrypted by the second private key;
b) providing the recovered first public key to be used for encrypting a content encryption key;
c) receiving the encrypted content encryption key; and
d) recovering the content encryption key using the first private key.

50. The method as set forth in claim 49, wherein the method further comprises the steps of:
e) receiving encrypted content; and
f) recovering content using the recovered content encryption key.

51. A machine readable storage medium having stored therein a plurality of programming instruction blocks that operates on corresponding subparts of a secret distributed among them, to be executed over a period of time.

52. A machine readable storage medium having stored therein a plurality of programming instructions that operates to partition a secret into a plurality of subparts, in response to being provided with the secret, and to generate a plurality of programming instruction blocks that operate on corresponding ones of the subparts.

53. A machine readable storage medium having stored therein a plurality of programming instruction blocks stored in a mutated form, except for at least one, which is stored in a plaintext form, wherein the mutated programming instruction blocks are recovered into the plaintext form during execution on an as needed basis, one or more but not all at a time.

54. A machine readable storage medium having stored therein a first plurality of programming instructions that operates to generate a plurality of subprograms for a program to obfuscate the program, in response to being provided with the program, the subprograms being generated in a mutated form, except for at least one, which is generated in a plaintext form, the subprograms being further generated with logic to recover the subprograms in plaintext form on an as needed basis, one or more but not all at a time.

55. A machine readable storage medium having stored therein a first and a second plurality of programming instructions that implements an application, with the first plurality of programming instructions implementing a security sensitive function of the application and the second plurality of programming instructions implementing a non-security sensitive function of the application, the first plurality of programming instructions having incorporated a first defensive technique of distributing a secret in space and in time and/or a second defensive technique of obfuscation to render the first plurality of programming instructions virtually unobservable and unmodifiable during execution.

56. A machine readable storage medium having stored therein a first, a second, a third, and a fourth plurality of programming instructions, wherein the first and second plurality of programming instructions implementing a first and a second integrity verification function for a first and a second application respectively, while the third and fourth programming instructions implementing a third and a fourth integrity verification function for a system integrity verification program, all four pluralities of programming instructions having incorporated defensive techniques rendering them tamper resistant, the four pluralities of programming instructions jointly implementing an interlocking trust mechanism, requiring the first and the second pluralities of programming instructions each to cooperate with both the third and fourth pluralities of programming instructions to complete any integrity verification.

57. A machine readable storage medium having stored therein a first and a second plurality of programming instructions, and a first secret private key, wherein the first and second pluralities of programming instructions implementing a first and a second tamper resistant decryption function, the first tamper resistant decryption function being used for recovering a first public key asymmetric to the first secret private key, using a second public key, the first public key having been previously encrypted using a second secret private key asymmetric to the second public key, the second tamper resistant decryption function being used for recovering a content encryption key using the first secret private key, the content encryption key having been previously encrypted using the first public key.

\* \* \* \* \*